United States Patent
Mair et al.

(10) Patent No.: US 7,949,682 B2
(45) Date of Patent: May 24, 2011

(54) METHOD FOR PROVIDING A FLAT VIEW OF A HIERARCHICAL NAMESPACE WITHOUT REQUIRING UNIQUE LEAF NAMES

(75) Inventors: David A. Mair, Spanish Fork, UT (US); Thomas N. Lee, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 1126 days.

(21) Appl. No.: 10/982,707

(22) Filed: Nov. 3, 2004

(65) Prior Publication Data

US 2005/0102299 A1 May 12, 2005

Related U.S. Application Data

(63) Continuation-in-part of application No. 10/702,259, filed on Nov. 5, 2003.

(51) Int. Cl.
G06F 7/00 (2006.01)
G06F 17/30 (2006.01)
(52) U.S. Cl. ........................................................ 707/796
(58) Field of Classification Search .............. 707/9, 10, 707/100, 999.009, 999.01, 999.1, 796, 793, 707/791, 790
See application file for complete search history.

(56) References Cited

U.S. PATENT DOCUMENTS

| | | | |
|---|---|---|---|
| 5,446,888 A * | 8/1995 | Pyne | ........................ 707/10 |
| 5,937,406 A | 8/1999 | Balabine et al. | |
| 6,144,959 A * | 11/2000 | Anderson et al. | ................. 707/9 |
| 6,256,739 B1 | 7/2001 | Skopp et al. | |
| 6,366,913 B1 | 4/2002 | Fitler et al. | |
| 6,421,675 B1 | 7/2002 | Ryan et al. | |
| 6,549,916 B1 | 4/2003 | Sedlar | |
| 6,583,797 B1 | 6/2003 | Roth | |
| 6,594,254 B1 | 7/2003 | Kelly | |
| 7,062,532 B1 | 6/2006 | Sweat et al. | |
| 2002/0016819 A1* | 2/2002 | Sugimoto et al. | ............ 709/203 |
| 2002/0059330 A1* | 5/2002 | Molnar | ........................ 707/205 |
| 2002/0107835 A1 | 8/2002 | Coram et al. | |
| 2002/0129135 A1 | 9/2002 | Delany et al. | |
| 2004/0193577 A1* | 9/2004 | Yaeger | ................................ 707/3 |
| 2005/0080783 A1* | 4/2005 | Arrouye et al. | ................... 707/6 |

OTHER PUBLICATIONS

S. Shepler et al., "Network File System (NFS) Version 4.0 Protocol," *IETF*, Apr. 2003.
D. L. Mills, "Internet Name Domains", COMSAT Laboratories, Sep. 1981, pp. 2-6; http://wwwietf.org/frc/rfc0799.txt?number=0799, RFC0799 published by the IETF.
SNIA: Common Internet File System (CIFS), Technical Reference, Revision 1.0, Release Date Mar. 1, 2002.

* cited by examiner

*Primary Examiner* — Brent Stace
(74) *Attorney, Agent, or Firm* — Marger Johnson & McCollom PC

(57) ABSTRACT

A set of flat identifiers are received, and a locality of reference cue determined. A cache is searched to locate an association including the combination of the set of flat identifiers and the locality of reference cue. If such an association is found in the cache, the hierarchical object(s) associated with that combination are used first in attempting to map the set of flat identifiers onto a hierarchical namespace.

31 Claims, 25 Drawing Sheets

METHOD FOR PROVIDING A FLAT VIEW OF A HIERARCHICAL NAMESPACE WITHOUT REQUIRING UNIQUE LEAF NAMES

RELATED APPLICATION DATA

This application is a continuation-in-part of co-pending commonly assigned U.S. patent application Ser. No. 10/702,259, filed Nov. 5, 2003, which is hereby incorporated by reference.

FIELD OF THE INVENTION

This invention pertains to namespace management, and more particularly to mapping flat names (or identifiers) to hierarchical names.

BACKGROUND OF THE INVENTION

To maintain security over resources, users are given account names and passwords. Before the users can access the resources, the users must provide their account name and password to the system. The system then checks the provided account name and password, and confirms that they match before the user is granted access to the resources.

Of course, users are not perfect. Especially where passwords are keyed in using a keyboard, users sometimes make mistakes entering their passwords. This problem is exacerbated by the fact that passwords are typically not displayed on screen (to keep others from seeing them as they are entered), and by the requirement that the passwords become increasingly longer and complex (to keep others from guessing the password).

But while an occasional error entering the password is expected, repeated errors are not. At some point, the probability shifts from the user making a mistake entering his password to someone attempting to break into the account without authorization. To prevent unauthorized users from breaking into the resources using another's account, typically the hacked account is frozen until an administrator unlocks the account. If it turns out that the user simply made one too many mistakes entering his password, he is temporarily inconvenienced; but a hacker is kept out of the system.

While this design works well in some situations, problems can arise where identifiers have to be translated between different environments. For example, consider the situation where users are divided into different containers within a single server. Within a given container, user names are distinct (to avoid uncertainty about which user is intended), but user names can be duplicated across different containers. Assume that containers A and B each include a (different) user "Joe." The name "Joe" is a flat name, and needs to be translated to the "Joe" of one of the containers. When "Joe" attempts to log in and access resources, the system has no way of knowing which user Joe is attempting to access the system. So the system attempts to authenticate "Joe" within each container in turn: for example, first with container A, then with container B. If the authentication within container A succeeds, then the user is granted access to the resources determined by container A. Otherwise, after the authentication within container A fails, the system attempts to authenticate "Joe" within container B. If the authentication within container B succeeds, then the user is granted access to the resources determined by container B. Otherwise, the user is informed that the authentication failed.

Note that in the above example, regardless of whether container A or container B successfully authenticates the user, the user is not informed of any other authentication attempts. For example, if the system cannot authenticate the user within container A, but the system can authenticate the user with container B, the user is not told that the user could not be authenticated within container A.

One way to address the problem described above is to have the user perform the translation. That is, "Joe" can be required to specify which container is to perform the authentication. But adding such a requirement would vary the login process from the norm (in that "Joe" would have to specify a container). In addition, "Joe" might not know to which container he belongs, and so could not specify the container. Finally, requiring users to identify their container limits the flexibility of the system: if a system administrator changes the containers without informing users, the users would be unable to log in to the containers.

In a related example, containers A and B can be on different servers, with the user logging into a proxy server. Other than the fact that servers A and B are both connected to the same proxy server, there might be no relationship between servers A and B. The proxy server is then responsible for determining which of servers A and B will be able to authenticate the user.

In ordinary usage, this straightforward approach to authentication works relatively well. But under unusual circumstances, the approach can have adverse consequences. For example, consider the situation above, and assume that "Joe" needs to be authenticated within container B several times in a row (e.g., "Joe" keeps losing his connection). Because the system tries to authenticate the user within container A first each time, the user Joe associated with container A might attempt to log into his account and be told that his account has been frozen, as it would appear to the system that someone attempted to break into the account of the user Joe associated with container A. A legitimate user has been inconvenienced in a situation where no inconvenience should have occurred.

Even ignoring the problem that a legitimate user can be inconvenienced when he should not be, this approach has other problems. It takes resources to attempt to authenticate "Joe" within container A, even when the authentication fails: resources that have to be allocated when "Joe" logs in, and released when the authentication fails. In addition, it takes the Joe authenticated within container B longer to log in than it does for the Joe authenticated within container A, because he first has to be rejected by container A every time.

The invention addresses these problems and others in the art.

SUMMARY OF THE INVENTION

The invention includes a hierarchical namespace and a cache. The hierarchical namespace includes objects organized in containers. The cache stores associations between sets of flat identifiers, locality of reference cues, and hierarchical objects in the hierarchical namespace. If a set of flat identifiers is received with a locality of reference cue such that there is an association in the cache between the set of flat identifiers, the locality of reference cue, and an associated hierarchical object, the associated hierarchical object can be tried first to map the set of flat identifiers.

DETAILED DESCRIPTION OF THE EMBODIMENTS

Figure 1:
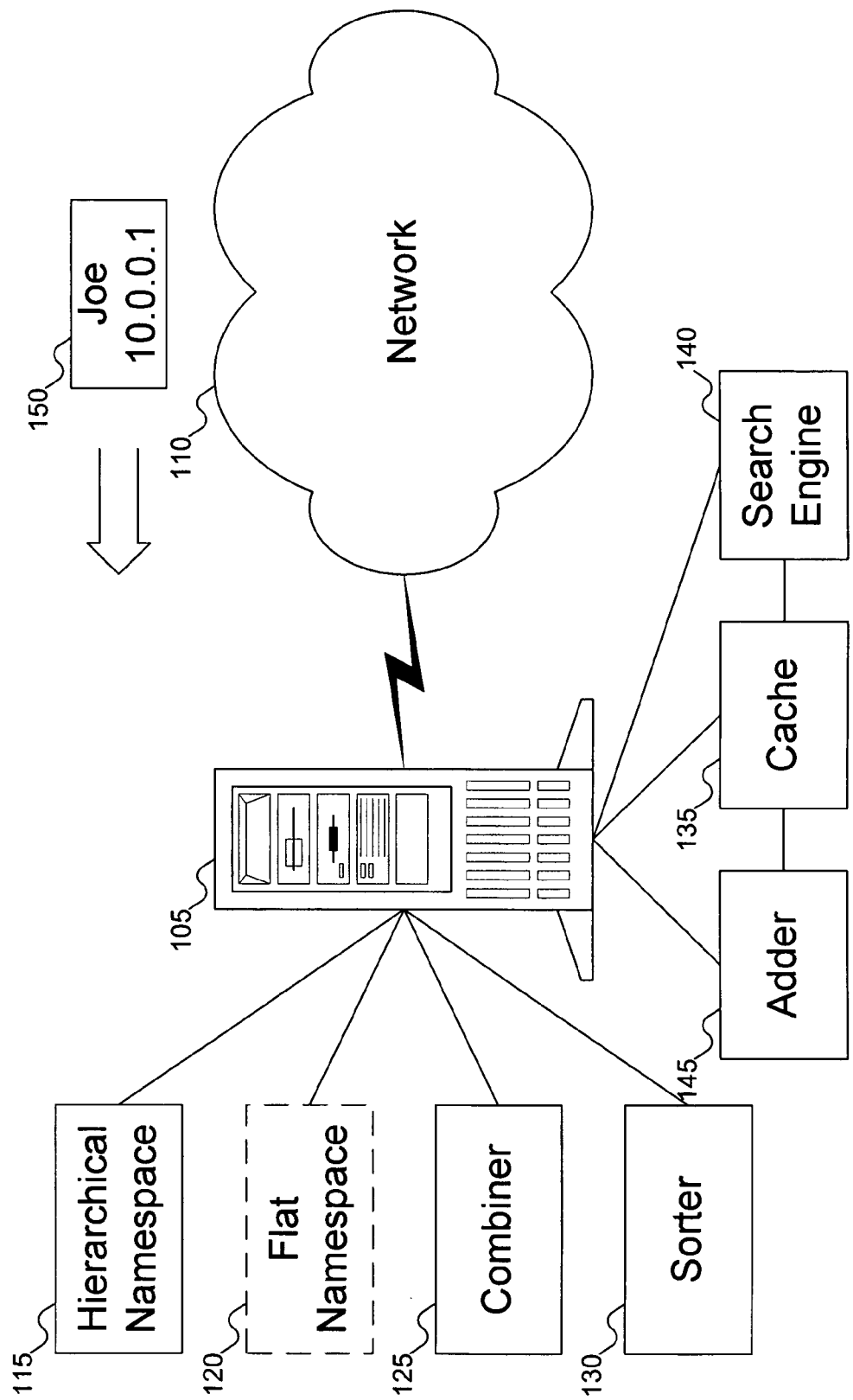
FIG. 1 shows a server equipped to map flat names to a hierarchical namespace, according to an embodiment of the invention.

FIG. 1 shows a server equipped to map flat names to a hierarchical namespace, according to an embodiment of the invention. FIG. 1 shows server 105 connected to network 110. Server 105 includes hierarchical namespace 115, flat namespace 120, combiner 125, and sorter 130. Hierarchical namespace 115 (sometimes called a container hierarchy, because it includes containers structured in a hierarchical manner) includes containers and identifiers organized in a hierarchy. Hierarchical namespace 115 is shown in greater detail in FIG. 2. Flat namespace 120 contains identifiers similar to those in hierarchical namespace 115, but without the organization imposed by hierarchical namespace 115. Flat namespace 120 is shown with a dashed line because it might not exist as a separate object. That is, flat namespace 120 might exist only as a part of some other object within the system. For example, flat namespace 120 can be derived from the leaf nodes of hierarchical namespace 115 (see below with reference to FIG. 2 for an example of a hierarchical namespace). Or, flat namespace 120 might be part of cache 135 (see below with reference to FIGS. 6-7 for details about cache 135). Combiner 125 is responsible for combining identifiers from flat namespace 120 with containers in hierarchical namespace 115. Finally, sorter 130 is responsible for sorting the combinations of identifiers and containers. The operations of combiner 125 and sorter 130 are discussed further below with reference to FIGS. 9-10, respectively.

Server 105 further includes cache 135, search engine 140, and adder 145. Cache 135 stores associations between flat identifiers, locality of reference cues, and hierarchical containers. Search engine 140 searches cache 135 to find any associations that include the combination of a flat identifier and a locality of reference cue. Finally, adder 145 adds new entries to cache 135, associating flat identifiers, locality of reference cues, and containers.

FIG. 1 shows information 150 being sent to server 105. Information 150 includes an identifier along with a locality of reference cue. The identifier in information 150 might or might not be an instance of a flat identifier in flat namespace 120, depending on whether the identifier in information 150 can be successfully authenticated. Although information 150 shows the identifier as a user name and the locality of reference cue as an Internet Protocol (IP) address, a person skilled in the art will recognize that either or both of the identifier and the locality of reference cue can vary. For example, instead of an IP address, the locality of reference cue can be the user's password. (A person skilled in the art will recognize that where sensitive information is used as the locality of reference cue (e.g., the user's password), such information can be encrypted before being stored in the cache to be used as a locality of reference cue.) And the identifier can be any identifier, not just a user's name. An example of an identifier/locality of reference combination not in the context of a user identifier can be found below with reference to FIG. 5.

Whereas the user explicitly provides the identifier, the locality of reference cue does not need to be explicitly provided by the user. For example, if the locality of reference cue is the IP address of the machine the user is using, the locality of reference cue can be provided automatically to the server. The user does not need to explicitly provide the machine's IP address (and, indeed, may not even know the machine's IP address). Of course, the user explicitly provides the password (although not for use as a locality of reference cue: the password is provided to authenticate the user).

A person skilled in the art will recognize that some embodiments of the invention can omit elements shown in FIG. 1. For example, if cache 135 is not updated, adder 145 can be omitted. Or, if cache 135 stores the complete hierarchical identifier (and not simply the container to which the flat identifier maps), combiner 125 can be omitted, especially if only combinations already in cache 135 are permitted (that is, if cache 135 does not store a hierarchical identifier to which a flat identifier can be mapped, then the flat identifier is not mapped to any hierarchical identifier). Or, if combinations of flat identifiers and containers in cache 135 are tried before combinations of flat identifiers and other containers, then sorter 130 can be omitted.

Figure 2:
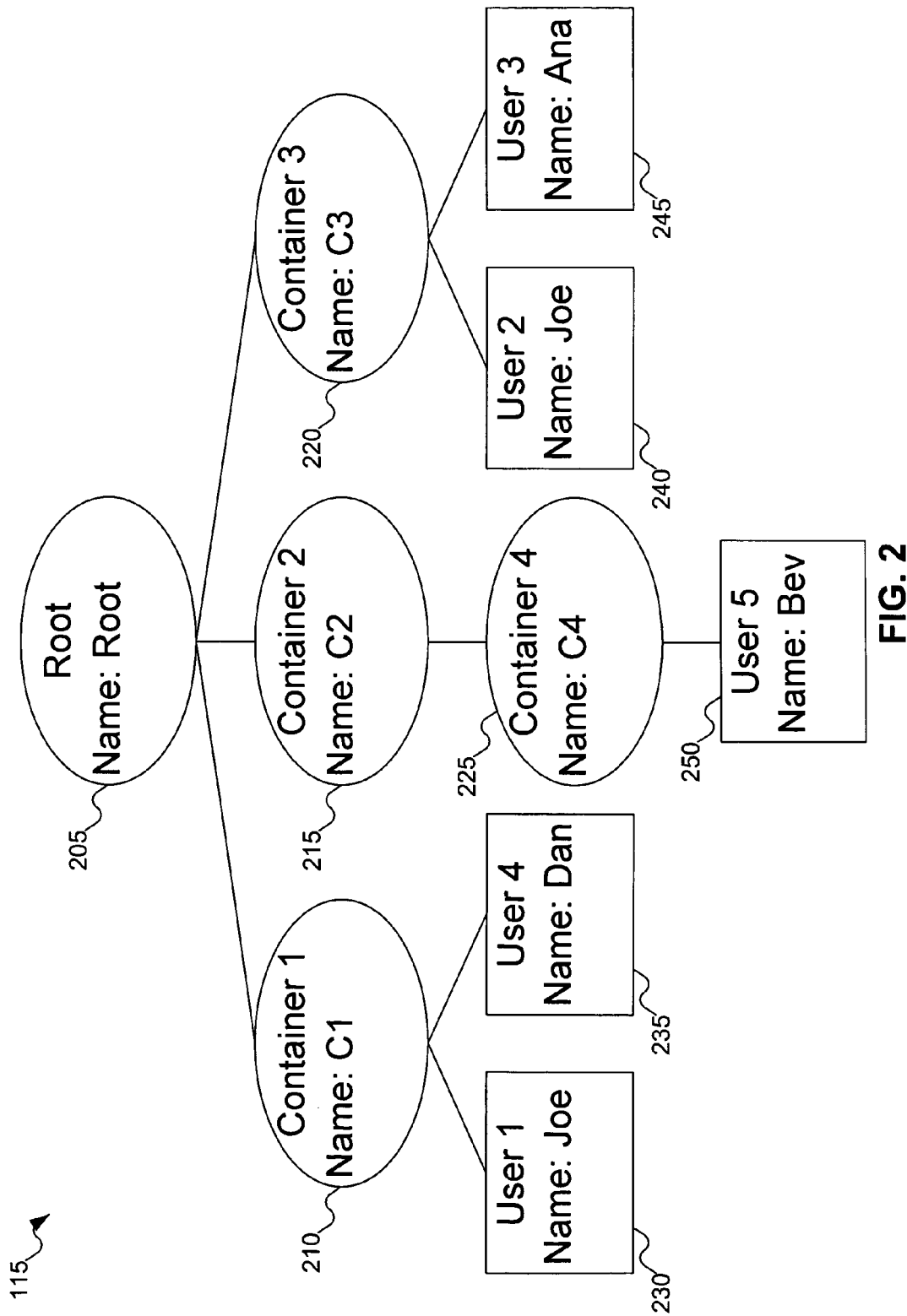
FIG. 2 shows an example of the hierarchical namespace of FIG. 1, according to an embodiment of the invention.
Figure 5:
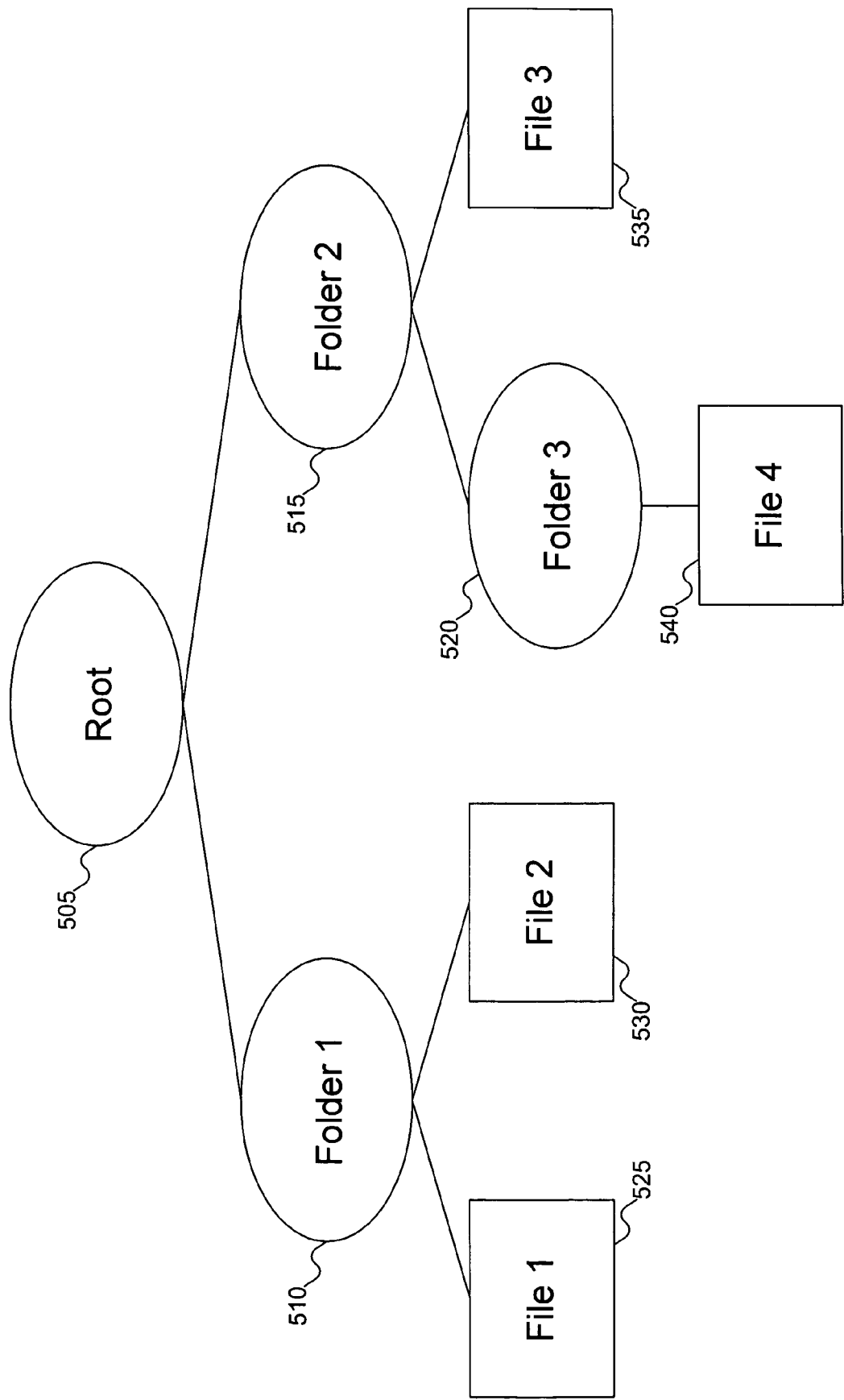
FIG. 5 shows a hierarchical structure for a file system, where a file in the file system is an object to be located using the server of FIG. 1, according to an embodiment of the invention.

FIG. 2 shows an example of the hierarchical namespace of FIG. 1, according to an embodiment of the invention. In FIG. 2, hierarchical namespace 115 is shown as a series of containers organized in a structure. For example, hierarchical namespace 115 is shown as including root 205 and four containers 210, 215, 220, and 225. Containers 210 and 220 each have two objects inside: container 210 has objects 230 and 235; and container 220 has objects 240 and 245. Container 220 includes container 225, which includes object 250. Objects 220-250, as they are not containers, are leaf nodes with the hierarchical structure of hierarchical namespace 115. Although in FIG. 2 objects 230-250 represent users, a person skilled in the art will recognize that the objects can represent anything that belongs in a hierarchical namespace. For example. FIG. 5 below shows files as objects in a hierarchical namespace.

For ease of reference later in this document, each container is named. For example, container 205 is named "Root," whereas containers 210, 215, 220, and 225 are named "C1," "C2," "C3," and "C4," respectively. A person skilled in the art recognize that these names are for the reader's understanding, and that the containers need not be named using human-readable names. To fully identify a particular container (for example, in the situation where two different containers have the same name), a container can be identified using a fully qualified path: that is, identifying the container and its path from the root of hierarchical namespace 115. Thus, for example, container 210 has a fully qualified path of C1.Root, whereas container 225 has a fully qualified path of C4.C2.Root.

Although FIG. 2 shows four containers in a particular organizational structure, a person skilled in the art will recognize that there can be any number of containers, organized in any desired structure. For example, there can be containers within containers to any desired level of nesting, and there can be any number of containers at any level in hierarchical namespace 115. In addition, although FIG. 2 shows two objects in containers 210 and 220 and one object in container 225, a person skilled in the art will recognize that there can be any number of user objects (or other object types) in the containers.

It is important that the reader understand the difference between objects in the hierarchical namespace 115, and hierarchical identifiers. Objects 230 and 250, for example, are objects in the hierarchical namespace, with the names "Joe" and "Bev," respectively. A hierarchical identifier, on the other hand, names an object in the hierarchical namespace, including the path to the object from the root of the hierarchical namespace. That is, a hierarchical identifier uniquely identifies an object in the hierarchical namespace. Thus, the hierarchical identifier identifying object 230 is Joe.C1.Root, and the hierarchical identifier identifying object 250 is Bev.C4.C2.Root. The significance of this distinction will be explained below with reference to FIG. 5.

The reader is specifically asked to notice that object 230 and object 240 both have the same name. The users are distinguished based on the containers in which their objects reside. For example, looking ahead to FIG. 4, in one embodiment containers 210 and 220 might represent servers 405 and 410, respectively.

Figure 3:
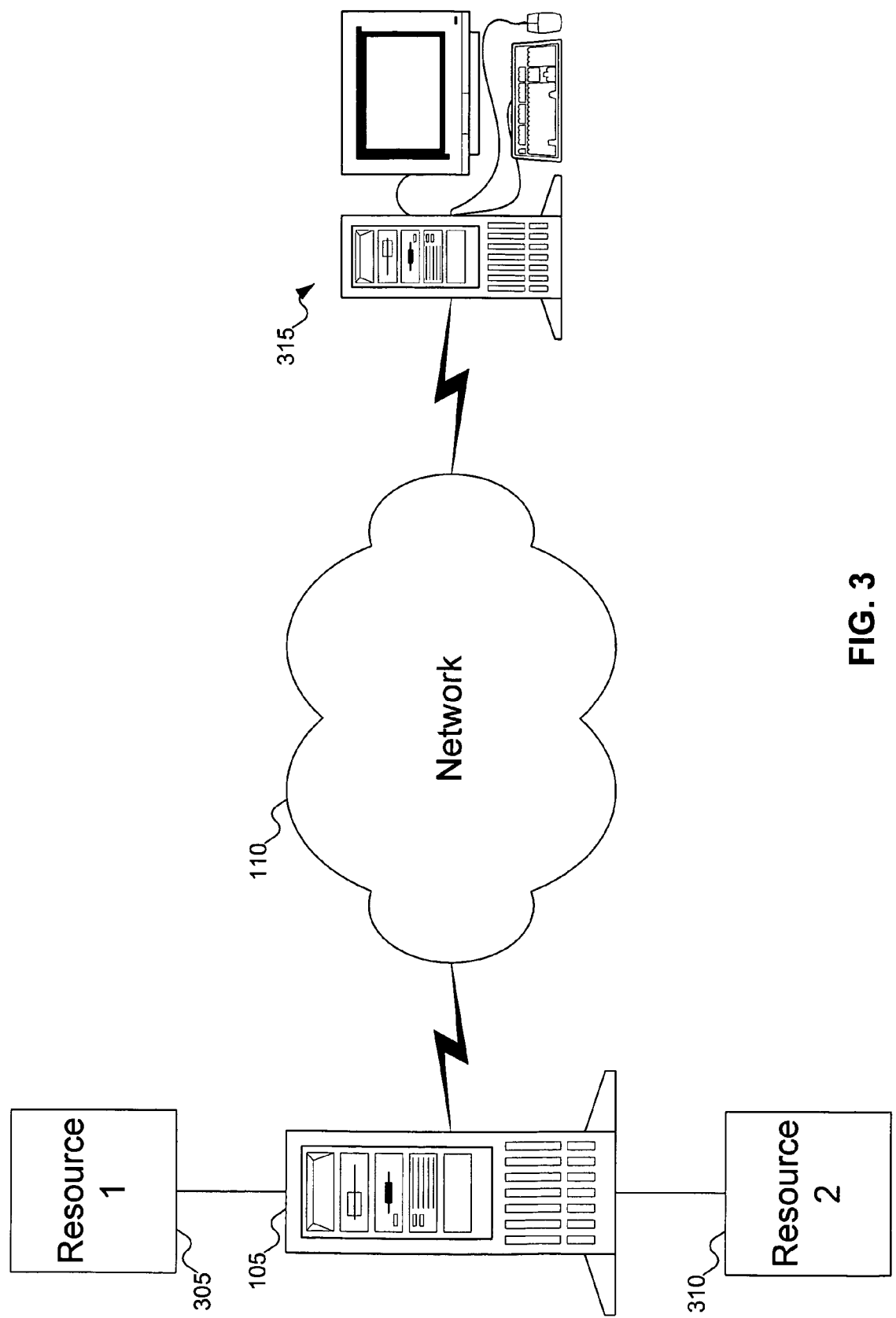
FIG. 3 shows the server and network of FIG. 1 connected to resources controlled by different access rights, according to an embodiment of the invention.

FIG. 3 shows the server and network of FIG. 1 connected to resources controlled by different access rights, according to an embodiment of the invention. In FIG. 3, resources 305 and 310 are shown, connected to server 105. As described earlier, one situation that embodiments of the invention are designed to address is where different users with the same identifiers attempt to access their respective resources. For example, there can be two users "Joe" in different containers, one each that can access resources 305 and 310. When a user attempts to access resources from computer 315, their access information is transmitted to server 105, as shown in FIG. 1. Thus, information 150 of FIG. 1 is transmitted from computer 315 to server 105. Server 105 then determines which resources the user is permitted to access based on his container, and then grants the user access to the appropriate resource.

Figure 4:
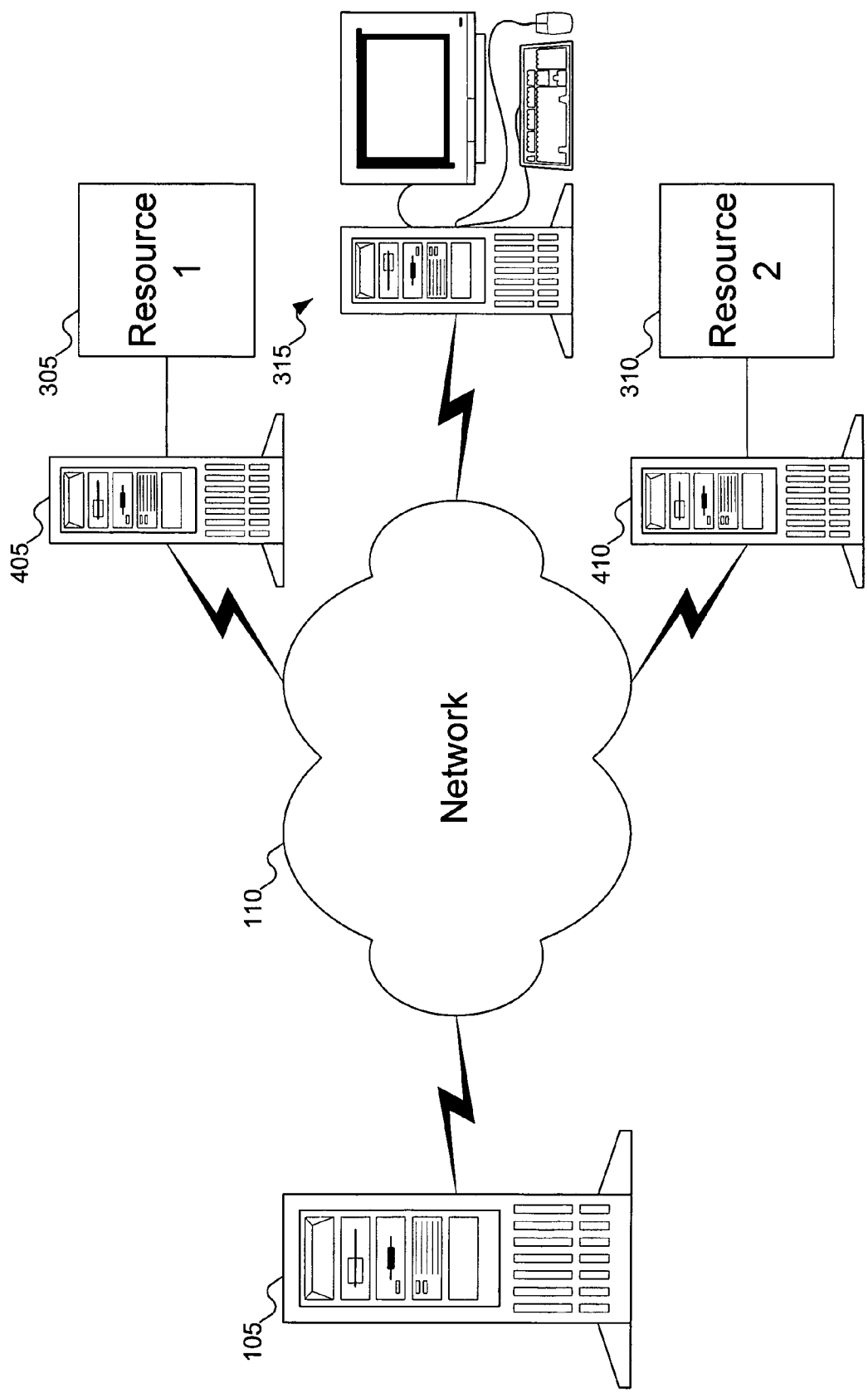
FIG. 4 shows the server and network of FIG. 3 with the resources on separate devices, according to an embodiment of the invention.

FIG. 3 shows one use for the invention: where containers control resource access. In FIG. 3, server 105 is responsible for determining to which containers the flat name is mapped, so that the containers can authenticate the user. In another embodiment, the containers are not resident within server 105, but are located elsewhere. FIG. 4 shows this situation. In FIG. 4, server 105 acts as a proxy server for servers 405 and 410. Server 105 uses the locality of reference cue to determine which server can authenticate the user. Once server 105 has determined which of servers 405 and 410 is more likely to authenticate the user, server 105 passes the login information to that server. Note that in FIG. 4, there might be no relationship between servers 405 and 410 (other than that they both have server 105 as a proxy server).

FIG. 5 shows a hierarchical structure for a file system, where a file in the file system is an object to be located using the server of FIG. 1, according to an embodiment of the invention. In FIG. 5, a folder structure is shown, including files and folders, rooted at root 505. FIG. 5 shows three folders 510, 515, and 520, and four files 525, 530, 535, and 540, stored in the folders. For example, file 540 is stored in folder 520, which is in turn stored in folder 515 off root folder 505.

The reason for showing the folder structure of FIG. 5 is to present an alternative use for an embodiment of the invention. A person skilled in the art will recognize the similarities between the folder structure of FIG. 5 and hierarchical namespace 115, shown in FIG. 2. These similarities suggest that files 525-540 of FIG. 5 can act as objects, and that folders 510-520 can act as containers. In fact, a file is a type of object, and a folder is a type of container, so the similarities are not coincidental.

An embodiment of the invention can be used to locate files within the folder structure of FIG. 5. Consider the situation where a user wants to locate file 540, without having to remember the specific path to the file from root folder 505. The file name can be used the object identifier. As for the locality of reference cue, there are several alternatives available: for example, the user's name, the user's password (suitably encrypted), and the IP address of the machine from which the request originates could all be used as locality of reference cues. As a result, the user can interact with the file system without having to concern himself with the folders in which specific files reside.

What happens if the file cannot be located using the cache? Then each folder (i.e., container) in the file structure is checked to see if it includes a file with the given identifier as a name. If more than one file in the folder structure includes the file name, the user is shown all of the files, along with their paths (to the extent that the user is entitled to use the files, of course).

To provide yet another use for an embodiment of the invention, consider an Internet-based search engine. The cache can identify the complete web site (plus path) on which a document is located, using an appropriate locality of reference cue. Note that although an IP address can be used as a locality of reference cue for this situation, there are better choices for the locality of reference cue (because the same document might be sought by many different searchers). As an alternative, the locality of reference cue could be the search terms used to locate the document, or the category/categories to which the document is classified within/the search engine.

A person skilled in the art will recognize that in the above-described embodiments of the invention, there is a relationship between the desired object and the container in which it is stored, but that this relationship has no significance to the object itself. In other words, the relationship between the object and its container imparts a meaning to a user of the object, but the object itself does not care about the container in which it is stored. For example, in FIG. 5, file 540 does not care whether it is in container 520 (as shown) or in any of the other containers. But the fact that file 540 is in container 520 is significant in determining the hierarchical identifier for file 540. If file 540 is moved to another container, even though the move does not matter to file 540, the move would change the hierarchical identifier for file 540.

Figure 6:
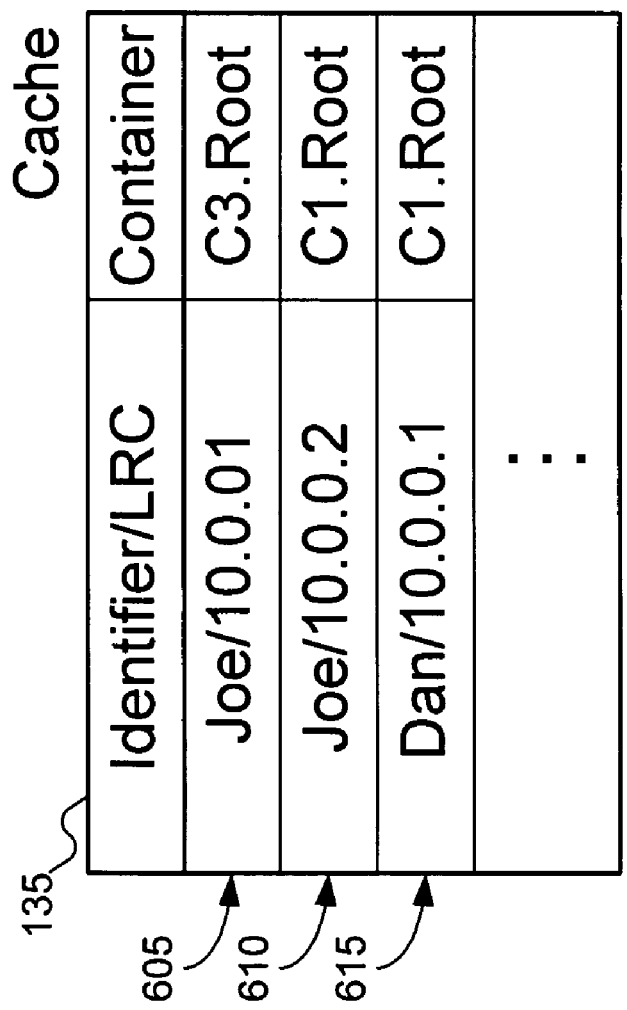
FIG. 6 shows an example structure for the cache of FIG. 1, according to an embodiment of the invention.

FIG. 6 shows an example structure for the cache of FIG. 1, according to an embodiment of the invention. In FIG. 6, cache 135 is shown as a table with two columns per row, but a person skilled in the art will recognize other arrangements that cache 135 can take. Each row in cache 135 associates a flat identifier, a locality of reference cue, and a container in the hierarchical namespace. For example, entry 605 shows that there is an association among the identifier "Joe," the locality of reference cue 10.0.0.1, and container C3, which is a direct child of the root of the hierarchical namespace. Entry 610, in contrast, shows an association among the identifier "Joe," the locality of reference cue 10.0.0.2, and the container C1. Finally, entry 615 shows that there is an association among the identifier "Dan", the locality of reference cue 10.0.0.1. and the container C1. which is a direct child of the root of the hierarchical namespace.

Although two or more entries can have the same identifier and locality of reference cue, typically the combination is unique. (An example of a situation where there might be two identical combinations of identifier and locality of reference cue is where two users with the same flat identifier (but mapped to different containers) use the same machine to log in to the server. In this situation, the server can make two different containers have higher priority over other containers in the hierarchical namespace, but cannot necessarily distinguish between the two choices, unless additional locality of reference cues are used, as discussed below.) Thus, the combination of the identifier and the locality of reference cue can be used as an index into cache 135.

As mentioned above with reference to FIG. 1, the flat namespace might exist only as a part of cache 135. For example, the flat namespace might be derived from cache 135 as the union of all of the identifiers in cache 135.

Figure 7:
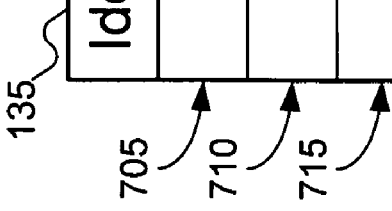
FIG. 7 shows an alternative structure for the cache of FIG. 1, according to an embodiment of the invention.

FIG. 7 shows an alternative structure for the cache of FIG. 1, according to an embodiment of the invention. In FIG. 7, rather than storing combinations of user identifiers and locality of reference cues, combinations of user identifiers and containers are stored. For each combination of user identifier and container, a list of locality of reference cues associated with the combination is shown. Thus, FIG. 7 shows entries 705. 710, and 715, which correspond to entries 605 610, and 615 of FIG. 6, but organized in a different manner. (In FIG. 7 only one locality of reference cue is shown for each combination of user identifier and container, but a person skilled in the art will recognize that there can be more than one locality of reference cue. For example, the user might access resources from two different machine IP addresses, such as a work machine and a home machine.)

A person skilled in the art will also recognize that, although FIGS. 6-7 show cache 135 including only one locality of reference cue (i.e., the IP address of the machine being used), more than one locality of reference cue can be used. For example, both the machine's IP address and the user's password can be used as locality of reference cues. Using more than one locality of reference cue at one time increases the probability that at most one entry will be found in the cache. In addition, cache 135 can include additional information not shown in FIGS. 6-7. For example, cache 135 can include information indicating the frequency of request for each association of flat identifier, locality of reference cue, and hierarchical container. This frequency information can enable an embodiment of the invention to prioritize between multiple containers associated with a single combination of flat identifier and locality of reference cue.

Figure 8:
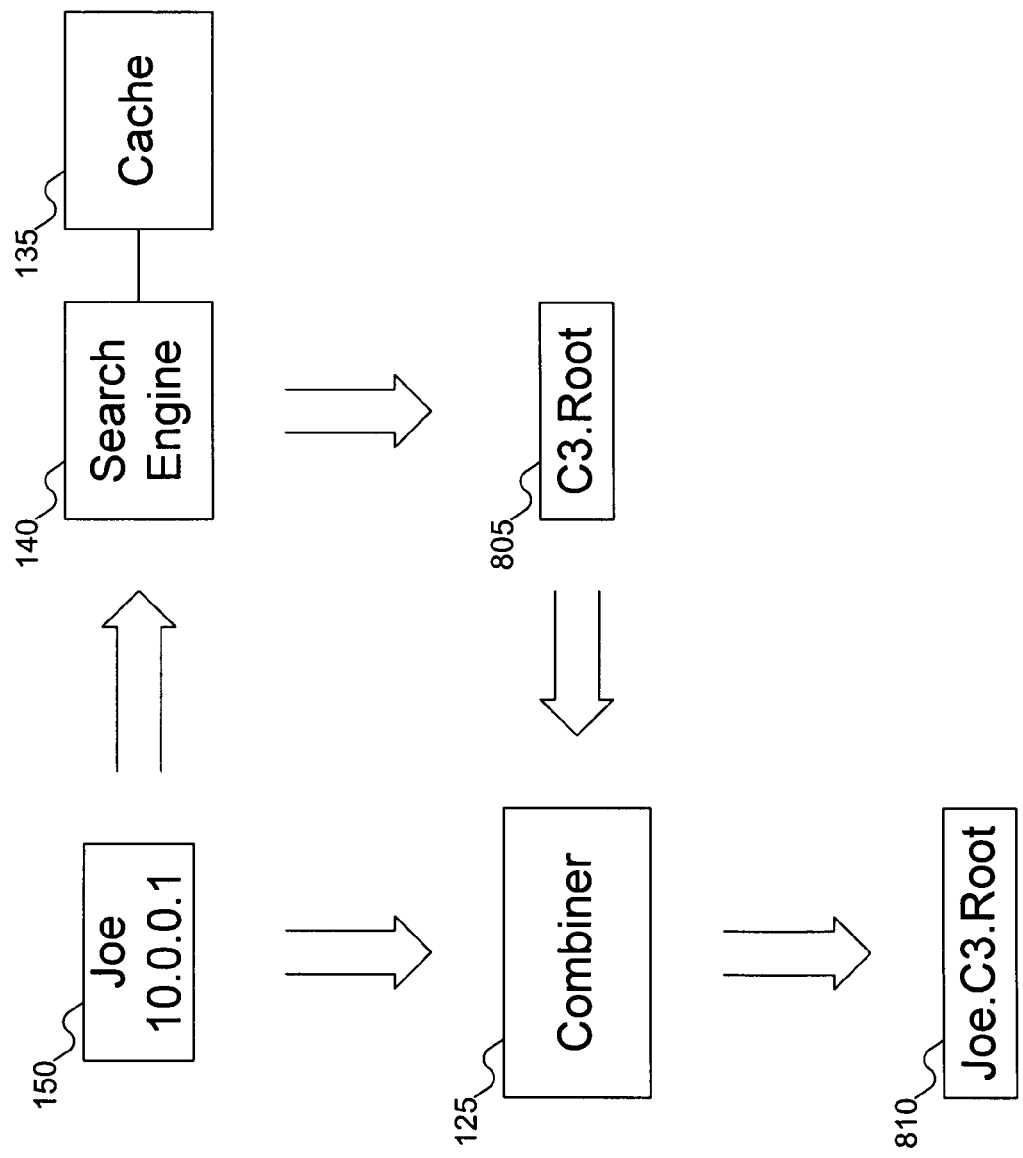
FIG. 8 shows the combiner of FIG. 1 mapping a flat identifier to a hierarchical identifier using the cache of FIG. 1, according to an embodiment of the invention.

FIG. 8 shows the combiner of FIG. 1 mapping a flat identifier to a hierarchical identifier using the cache of FIG. 1, according to an embodiment of the invention. In FIG. 8, information 150 is first presented to search engine 140, which searches cache 135 for the combination of the identifier "Joe" with the locality of reference cue "10.0.0.1 " in cache 135. FIG. 8 shows search engine 140 returning container reference 805, which combiner 125 combines with the identifier "Joe," to produce hierarchical identifier 810.

In an embodiment of the invention using combiner 125 as shown in FIG. 8, combiner 125 initially is only used to combine the identifier with containers located in cache 135 using search engine 140. In this embodiment, combiner 125 does not combine the identifier with other containers in the hierarchical namespace until after the most likely containers (those found in cache 135) are tested. This avoids generating less likely hierarchical identifiers until after the most likely hierarchical identifiers have been tried. (Whether combiner 125 can generate these less likely hierarchical identifiers depends on the implementation of the embodiment of the invention: if combiner 125 is only used to combine the identifier with the container references found in cache 135, then combiner 125 does not generate these less likely hierarchical identifiers, even if the more probable hierarchical identifiers do not actually locate the needed object.

Figure 9:
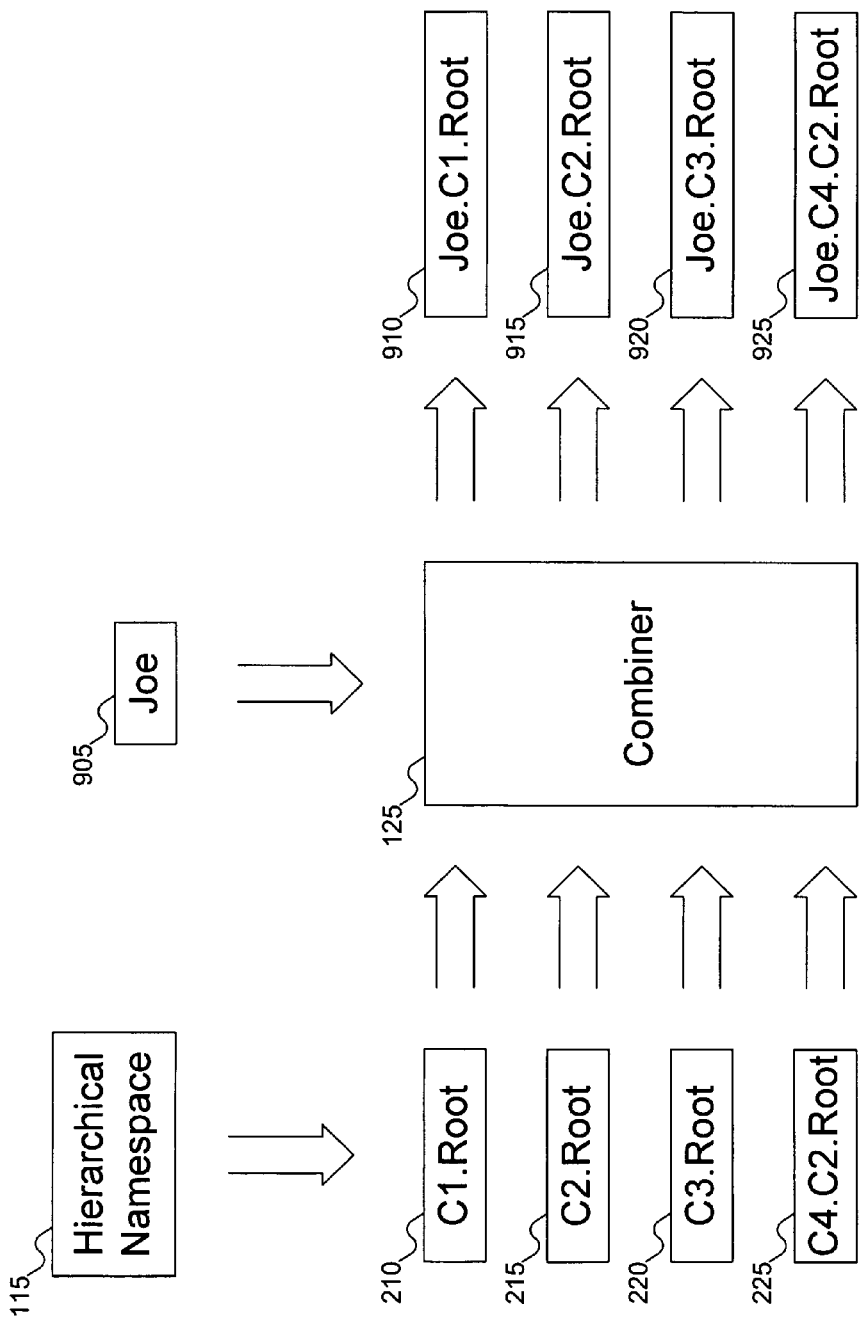
FIG. 9 shows the combiner of FIG. 1 operating to generate hierarchical identifiers from flat names and containers in the hierarchical namespace, according to an embodiment of the invention.

FIG. 9 shows the combiner of FIG. 1 operating to generate hierarchical identifiers from flat names and containers in the hierarchical namespace, according to an embodiment of the invention. In FIG. 9, combiner 125 is shown combining identifier 905 from information 150 (see FIG. 1) with containers in hierarchical namespace 115. Since hierarchical namespace 115 includes four containers (see FIG. 2), combiner 125 combines identifier 905 with each of the four containers. Combiner 125 results in combinations 910, 915, 920, and 925. Note that hierarchical identifiers 910, 915, 920, and 925 show the identifier as the most significant information prefixing each container's path to the root of hierarchical namespace 115, but a person skilled in the art will recognize that combiner 125 can produce hierarchical identifiers 910, 915, 920, and 925 in other forms. In addition, as mentioned above, a person skilled in the art will recognize that combiner 125 might not be needed: for example, if the cache stores a hierarchical identifier rather than just a container, or if only entries in the cache are used (that is, combiner 125 does not try to combine the identifier with other containers in the hierarchical namespace but not in the cache).

Figure 10:
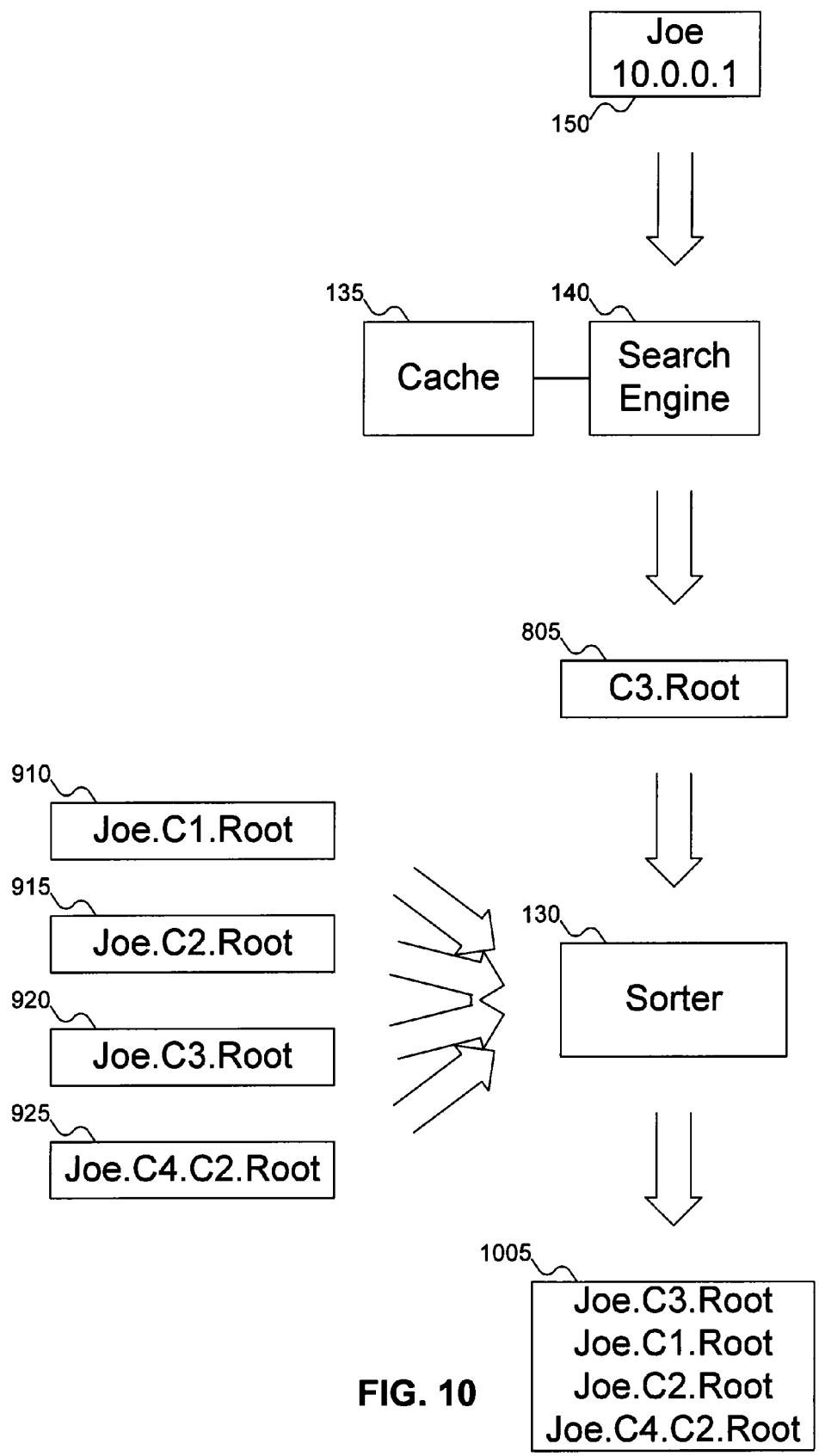
FIG. 10 shows the sorter of FIG. 1 ordering the hierarchical identifiers generated by the combiner of FIG. 9, according to an embodiment of the invention.

The reader might be wondering what the significance of FIG. 9 is relative to FIG. 8. The (superficial) difference is that in FIG. 9, combiner 125 is combining the identifier will all containers in the hierarchical namespace, and is not limited to containers found in the cache. But in FIG. 8 the search engine was used to (initially) narrow the scope of operation of combiner 125. In FIG. 9, combiner 125 is used to generate all possible hierarchical identifiers. As shown in FIG. 10, discussed next, in this embodiment, search engine 140 is used to prioritize the order of the hierarchical identifiers, thereby avoiding having to use combiner 125 again at a later time (in case cache 135 does not include the needed container for the identifier).

FIG. 10 shows the sorter of FIG. 1 ordering the combinations of flat names with the hierarchical namespace, according to an embodiment of the invention. In FIG. 10, information 150 is shown being presented to search engine 140. Search engine 140 searches cache 135 to see if there is any entry in cache 135 that associates a container, and the identifier and the locality of reference cue in information 135. Referring back to FIG. 6, the reader can see that entry 605 associates the identifier "Joe" and the locality of reference cue 10.0.0.1 with the container C3. So, search engine 140 returns container reference 805. Although FIG. 10 shows search engine returning only one container reference from cache 135, a person skilled in the art will recognize that there can be more than one container reference returned by search engine 140. For example, if it turns out that there is more than one container reference associated with the identifier "Joe" and the locality of reference cue 10.0.0.1, then all of these container references can be returned by search engine 140.

Sorter 130 then uses the results of search engine 140 to prioritize the hierarchical identifiers generated by the combiner, as shown in list 1005. For example, referring back to FIG. 9, combiner 125 returned four hierarchical identifiers of the identifier "Joe" with various containers. As search engine 140 found one entry including the identifier "Joe" and the locality of reference cue 10.0.0.1 (specifically, container C3), sorter 130 prioritizes the hierarchical identifier including the associated container to be the first one tried by the system when mapping the identifier "Joe" onto the containers. If the identifier "Joe" cannot be successfully mapped onto container C3, then the other containers, as returned by combiner 125, are tried in turn.

Referring back to FIG. 6, the reader will note that both entries 605 and 610 map the identifier Joe, albeit with different locality of reference cues. It can happen that cache 135 can include multiple entries associating the same combination of identifier and locality of reference cue to different containers. For example, if the locality of reference cue is the IP address of the machine from which users attempt to access resources, then if both users with identifiers of "Joe" access their various resources from the same computer, there will be entries for each of them in cache 135. A person skilled in the art will recognize that entries in cache 135 can differ based on any of the fields: identifier, locality of reference cue, or container. Where the entries differ in identifier, the entries refer to different objects (in the case of FIG. 6, users, but a person skilled in the art will recognize that a single user can have objects in multiple containers). Where the entries differ in locality of reference cue, the entries refer to objects with different localities. And where the entries differ in container, the entries refer to objects mapped to different containers. (Obviously, there has to be at least one difference between two entries in cache 135, or else there would be a redundant entry in cache 135.)

A person skilled in the art will recognize that when both the identifier and the locality of reference cue for two entries in cache 135 are the same, then the system does not have a way to distinguish between the two entries. Without a way to distinguish between entries, the system might not select the correct container to map the object to first. But the odds of there being more than one identical combination of identifier and locality of reference cue are low, making this proposition unlikely.

Figure 11:
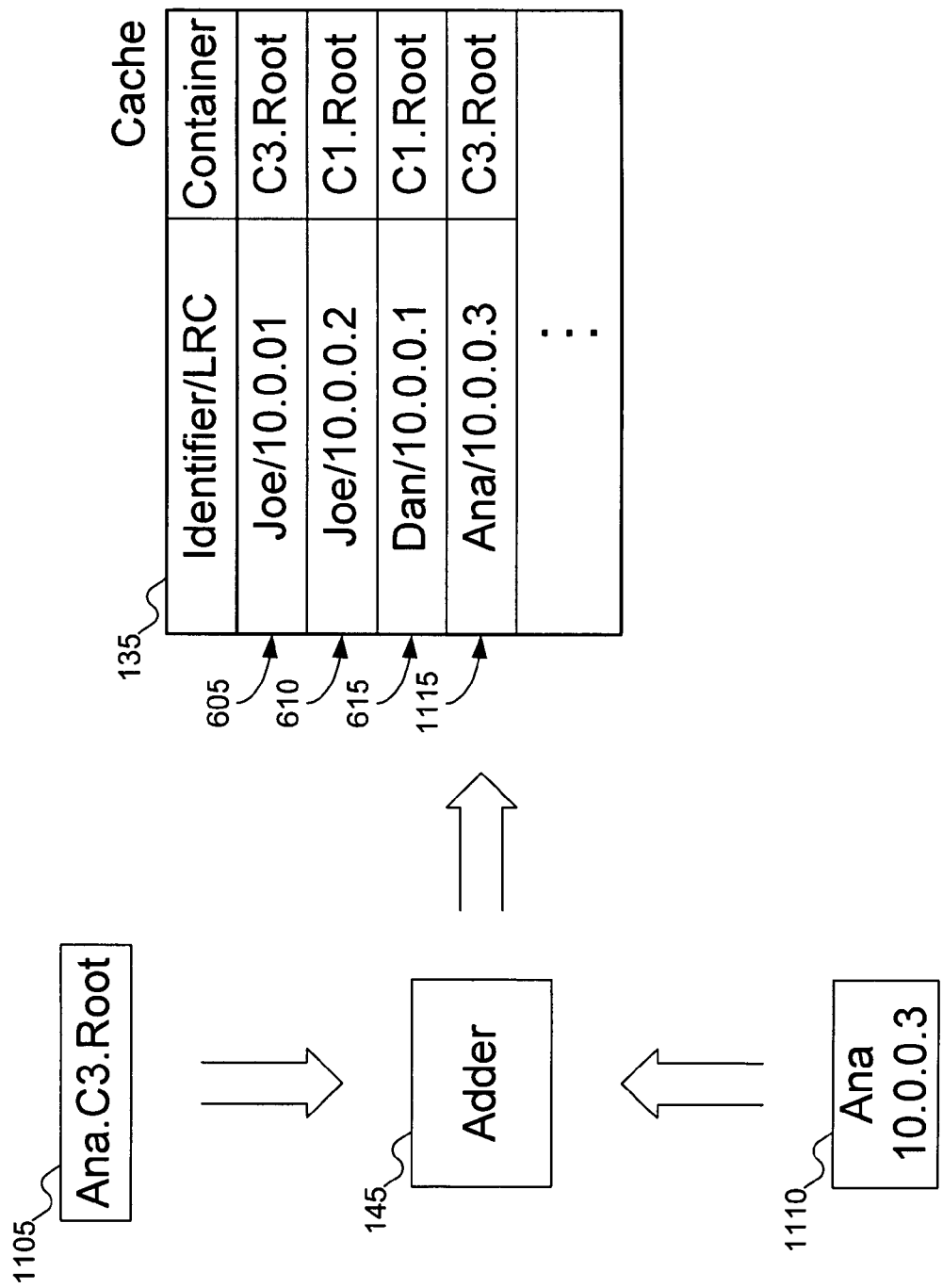
FIG. 11 shows the adder of FIG. 1 adding an association to the cache of FIG. 1, according to an embodiment of the invention.

In some situations, the cache might not include an entry associating the flat identifier, the locality of reference cue, and the container to which the flat identifier actually maps. Once the correct container to which the identifier maps is determined, this new association can be added to the cache. This situation is shown in FIG. 11. Adder 145 is shown receiving container reference 1105, which is the container to which the object was successfully mapped. Adder 145 also receives information 1110, which includes the identifier and the locality of reference cue. This new association is then added to cache 135, as shown in entry 1115.

Figure 12A:
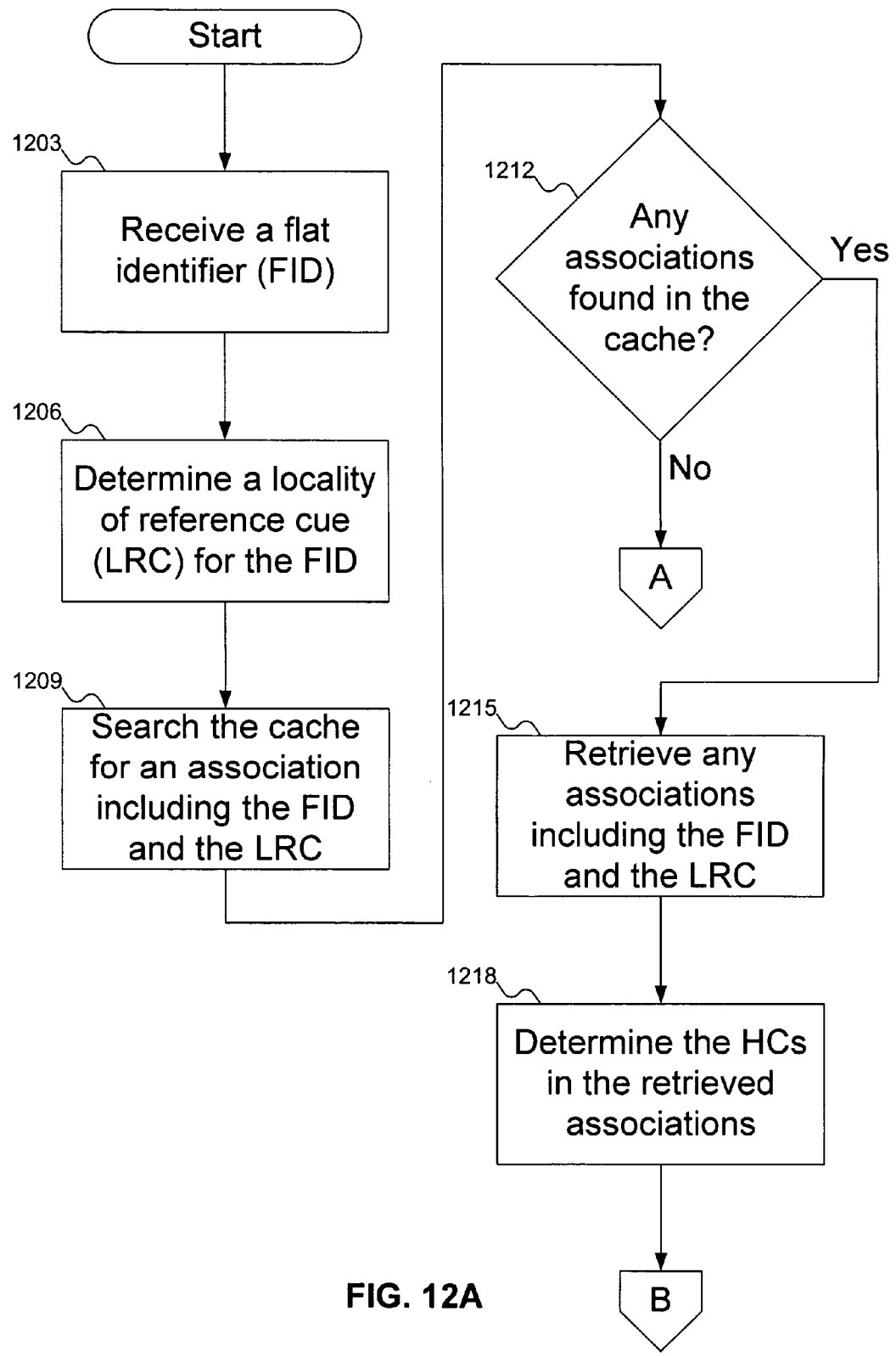
FIGS. 12A-12D show a flowchart of the procedure for using the cache of FIG. 1, according to an embodiment of the invention.
Figure 12B:
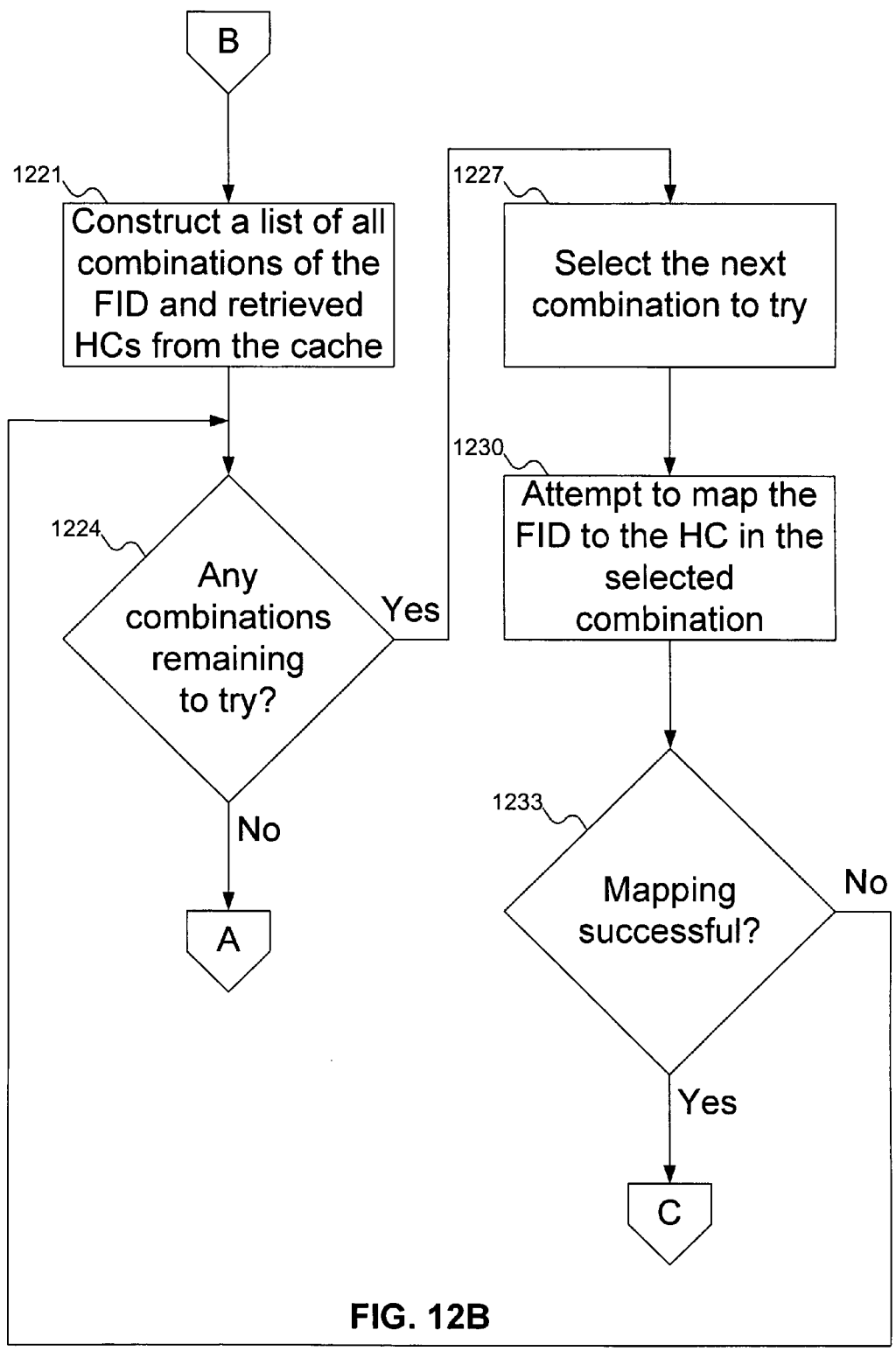

FIGS. 12A-12D show a flowchart of the procedure for using the cache of FIG. 1, according to an embodiment of the invention. In FIG. 12A, at step 1203, the system receives a flat identifier. At step 1206, the system determines a locality of reference cue for the flat identifier. The locality of reference cue can be received by the system (e.g., sent along with the flat identifier), or it can be determined by the system independently. For example, when two applications are communicating across a network, in some implementations the applications only know the identity of the other application, not its location. When one application receives the flat identifier from the other application, the first application has to actively determine the location (i.e., IP address) of the machine running the other application. (The specifics of how the application determines the IP address is beyond the scope of this document.) At step 1209, the system searches the cache for any entries associating the combination of the flat identifier and the locality of reference cue with any hierarchical containers.

At step 1212, the system checks to see if it found any associations in the cache. If the system found at least one association in the cache, then at step 1215 the system retrieves the found associations. At step 1218, the system determines the hierarchical containers that were in the retrieved associations.

At step 1221, the system constructs a list of combinations of the hierarchical containers that were retrieved from the cache and retrieved hierarchical containers. At step 1224, the system begins processing the list of combinations. At step 1224, the system determines if there are any remaining combinations to try. If so, then at step 1227 the system selects the next combination to try. At step 1230, the system attempts to map the flat identifier to the hierarchical container in the selected combination. At step 1233, the system checks to see if the mapping succeeded: if the mapping failed, then processing returns to step 1224 to try and select another combination.

Figure 12C:
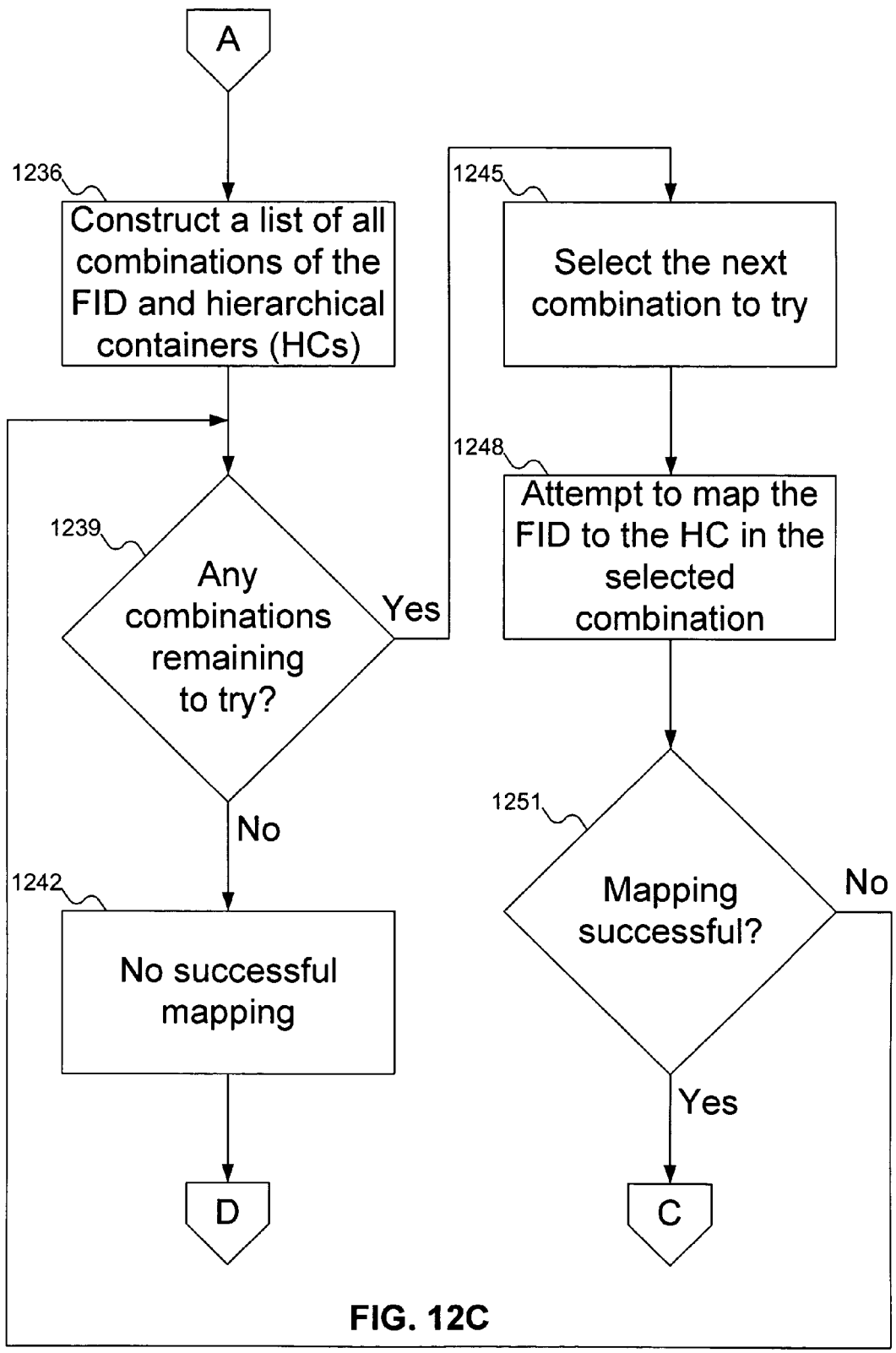
Figure 12D:
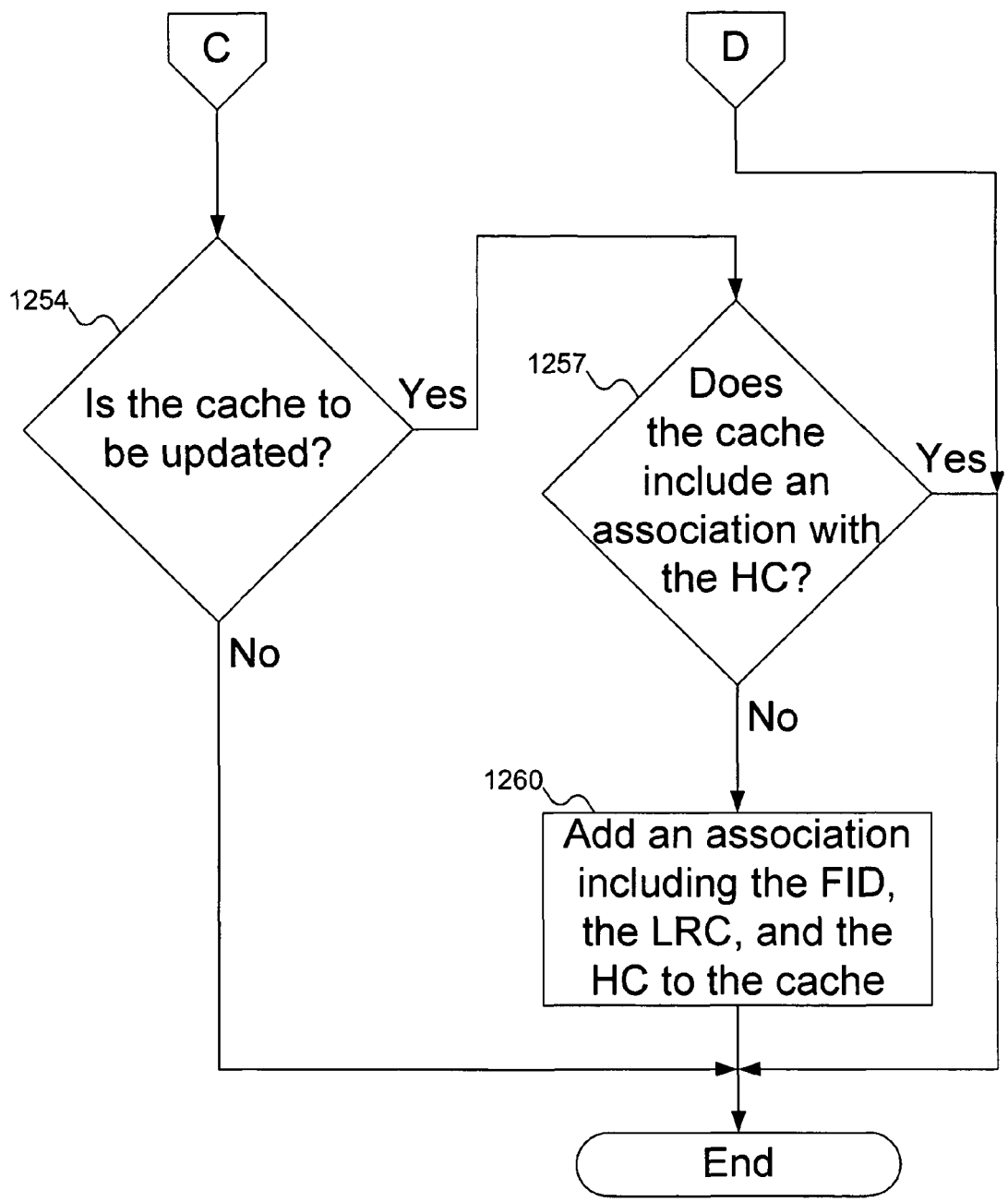
Figure 13A:
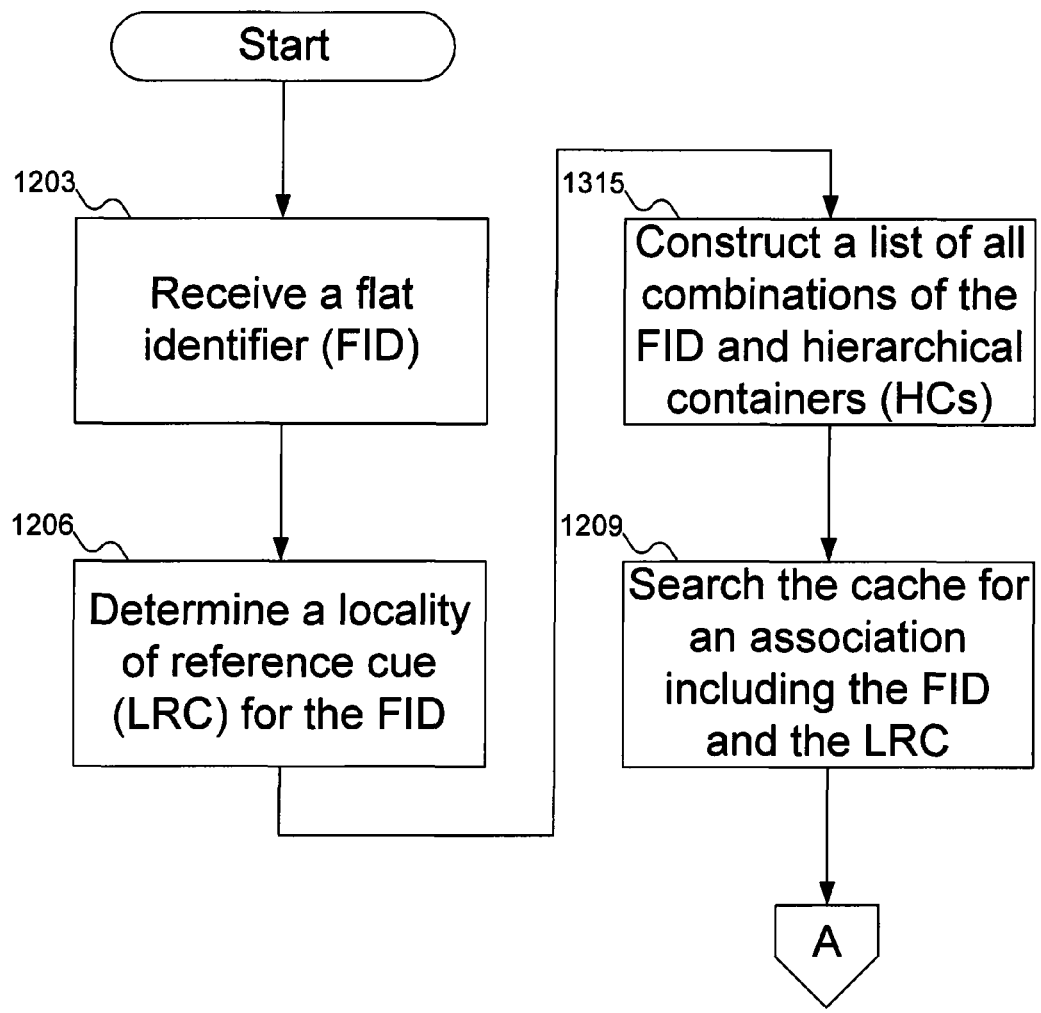
FIGS. 13A-13D show a flowchart of an alternative procedure for using the cache of FIG. 1, according to an embodiment of the invention.
Figure 13B:
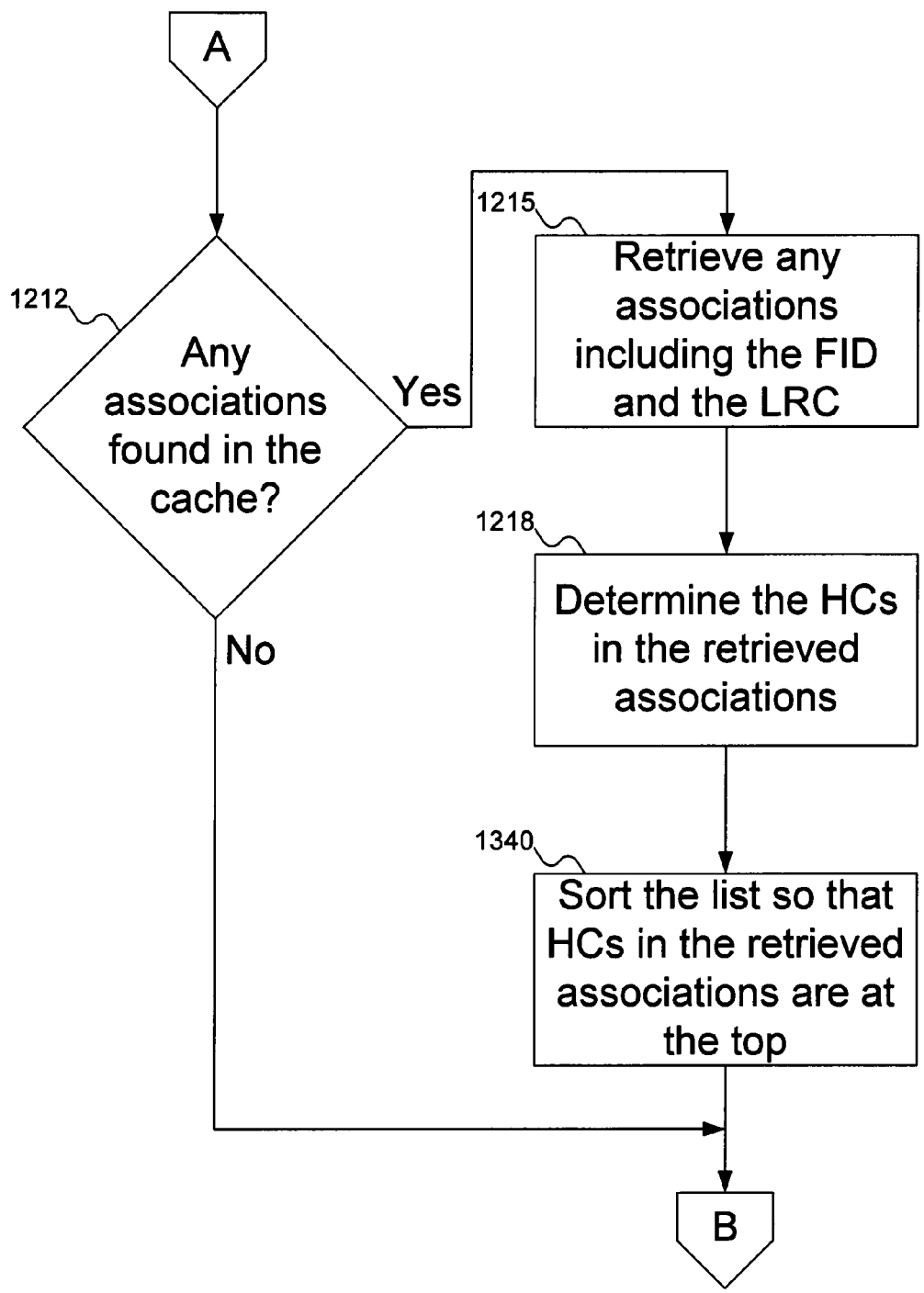
Figure 13C:
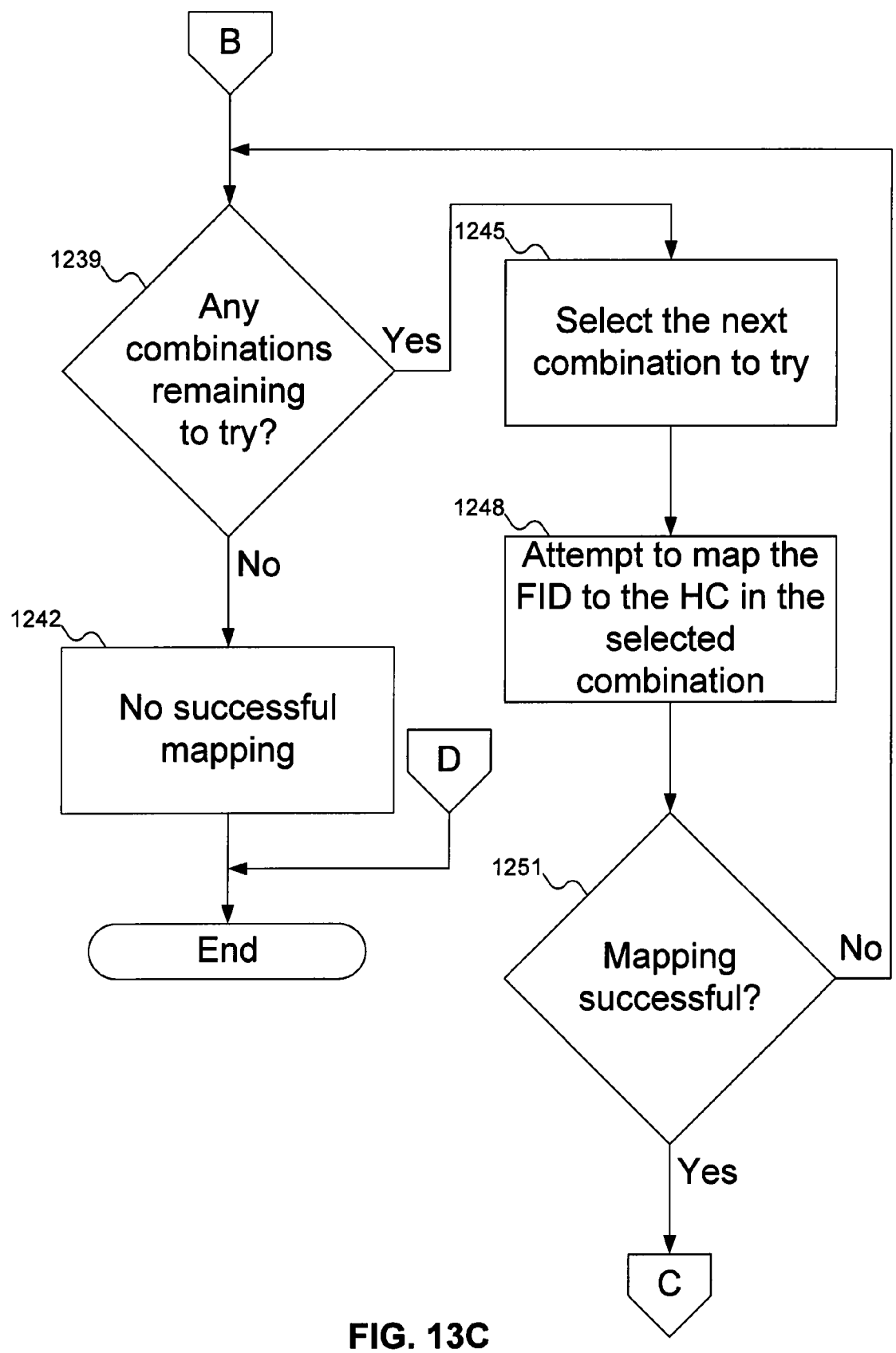
Figure 13D:
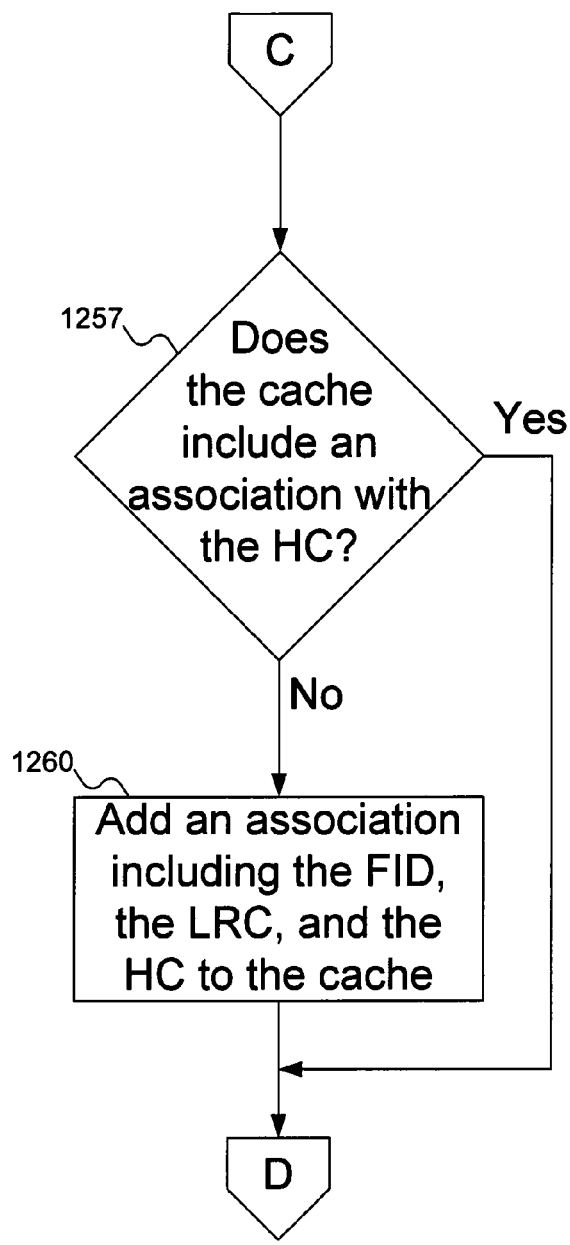

If no mapping was successful, or if there were no associations in the cache to begin with (back at step 1212), the processing continues with step 1236 (FIG. 12C). At step 1236, the system constructs a list of all combinations of flat identifiers and hierarchical containers (in this case, including all containers in the hierarchical namespace). At step 1239, the system determines if there are any remaining combinations to try. If there are no remaining combinations, then at step 1242 the system was unable to map the flat identifier, and processing is complete. If there is a combination remaining, then at step 1245 the system selects the next combination to try. At step 1248, the system attempts to map the flat identifier to the hierarchical container in the selected combination. At step 1251, the system checks to see if the mapping succeeded: if the mapping failed, then processing returns to step 1239 to try and select another combination.

If the mapping succeeded, then at step 1254, the system checks to see if the cache is to be updated with the new combination. In general, the cache is updated with new combinations, but a person skilled in the art will recognize that the system can be configured to prevent cache updates (e.g., for security reasons). If the cache is to be updated, then at step 1257, the system checks to see if the cache includes an association of the flat identifier and the locality of reference cue with the successful container. If not, then at step 1260, the system adds an association to the cache for the successful container.

Although FIGS. 12A-12D describe one possible implementation of an embodiment of the invention, a person skilled in the art will recognize possible variations. For example, at step 1224 (FIG. 12B), if the system was unable to map the flat identifier to a container associated with the flat identifier and the locality of reference cue in the cache, then the system attempts to map the flat identifier to any container in the hierarchical namespace. Instead, as described above, the system could be configured to only try containers found in the cache: in this variation, steps 1236-1239 and 1245-1251 are omitted, and processing continues in that case with step 1242.

FIGS. 13A-13D show a flowchart of an alternative procedure for using the cache of FIG. 1, according to an embodiment of the invention. In FIGS. 13A-13D, the procedure is similar to that of FIGS. 12A-12D, but instead of initially constructing the list of hierarchical identifiers only from containers found in the cache, a list of all possible hierarchical identifiers is generated (step 1315 of FIG. 13A), and then sorted using the containers found in the cache (step 1340 of FIG. 13B).

All of the above discussion centers around mapping a single flat identifier to a hierarchical object. That is, given a single flat identifier, there could be one or many hierarchical objects with the corresponding flat name; the embodiments of the invention described above with reference to FIGS. 1-13 attempt to resolve the flat identifier to one hierarchical object in the hierarchical namespace. But the problem can be generalized slightly. Instead of processing a single flat identifier, server 105 might be presented with multiple flat identifiers at one time. For example, server 105 might be asked at the same time to authenticate "Joe", "Bev", and "Ana" at one time: perhaps all received in a single message from the machine requesting hierarchical resolution of the flat identifiers. It could be that "Joe", "Bev", and "Ana" were only coincidentally provided at the same time, and can be resolved independently. Thus, server 105 might treat the single message as if it were three separate messages, and process "Joe", "Bev", and "Ana" separately.

But what if there is significance to "Joe", "Bev", and "Ana" requesting authentication at the same time? For example, what if "Joe", "Bev", and "Ana" are the three administrators for a machine, and need to be authenticated at the same time to accomplish some specific objective? In that situation, if server 105 were to treat the three flat identifiers as if they had arrived in separate messages, the three administrators could not be authenticated at the same time, and would not be able to accomplish their objective. Thus, a generalized solution to the problem would consider receiving many flat identifiers at the same time, and resolving them to one or many hierarchical identifiers at the same time.

Figure 14:
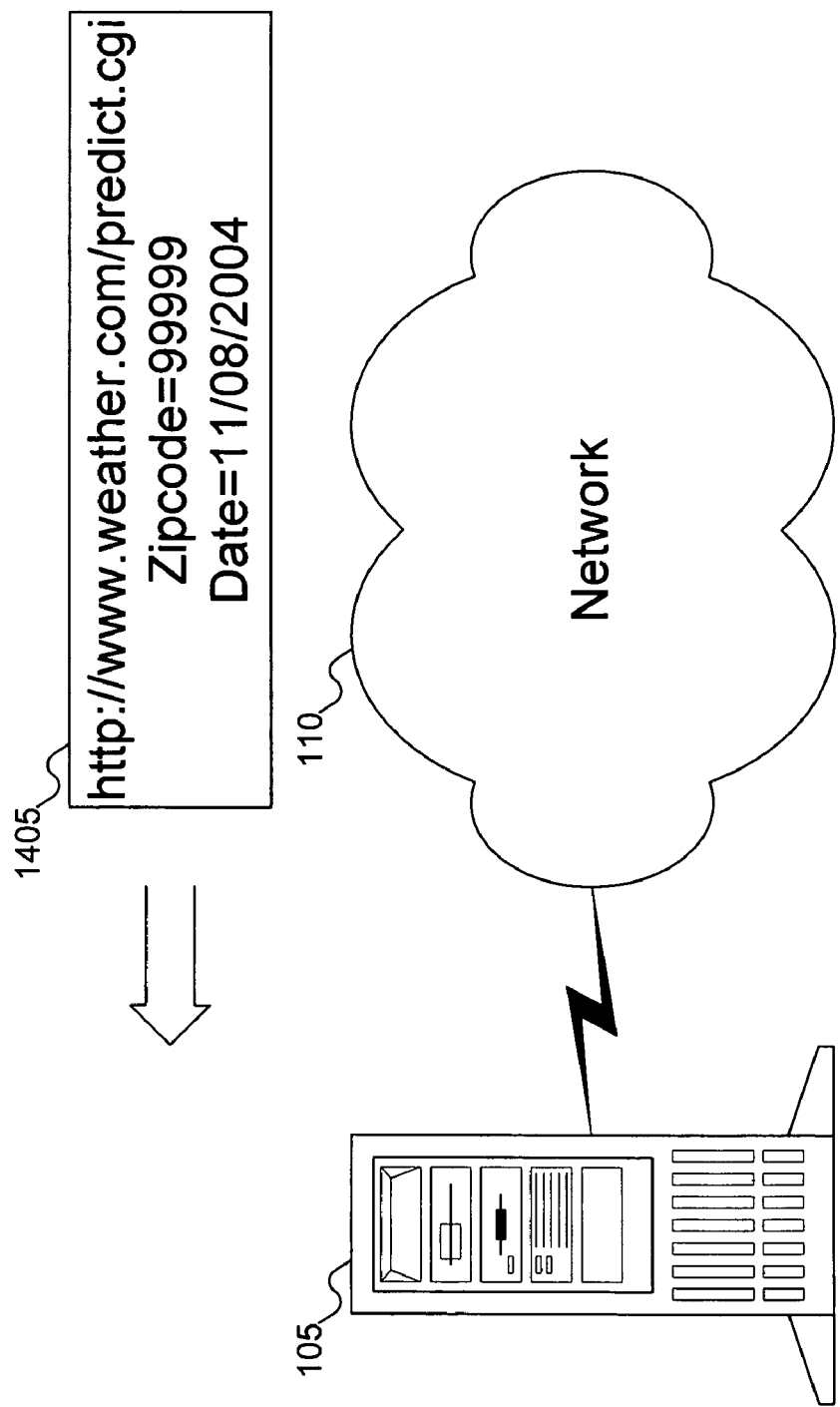
FIG. 14 shows the server of FIG. 1 adapted to map a set of flat identifiers to hierarchical objects in the hierarchical namespace, according to an embodiment of the invention.

FIG. 14 shows server 105 of FIG. 1 adapted to map set of flat identifiers 1405 to hierarchical objects in the hierarchical namespace, according to an embodiment of the invention. In contrast to the situation presented in FIG. 1 (showing a single flat identifier), FIG. 14 shows multiple flat identifiers being sent as set 1405. Specifically, the flat identifiers include the network address "http://www.weather.com/predict.cgi", the zip code "99999", and the date "Nov. 8, 2004". As discussed above with reference to FIG. 5, the invention has uses other than for user authentication. In this example, the described embodiment of the invention is used to improve accessing desired documents on a network, but a person skilled in the art will recognize that embodiments of the invention can be used to locate desired resources in general.

The reader might start by asking whether the described embodiment of the invention is even applicable in this situation, as the network address "http://www.weather.com/predict.cgi" is a fully defined path to the resource. The answer is that the embodiment of the invention is still useful, as the desired resource in this case is not the site identified by the address, but a document that can be generated at that site: namely, the predicted weather conditions for a particular zip code on a particular day. In other words, the hierarchy defined by "http://www.weather.com/predict.cgi" is not the hierarchy of interest; the hierarchy of interest is the one implied by the parameters being provided.

Without the invention, set 1405 is handled as follows. The network address "http://www.weather.com/predict.cgi" is located and accessed. The parameters "zipcode=99999" and "date= Nov. 8, 2004" are provided to the script. The script accesses the appropriate data, and returns a "page" that is formatted for display in the user's browser. Of course, this "page" does not actually exist as a file saved somewhere. Instead, it generated dynamically as a result of the user's request for data and based on the provided parameters. This means that if another user comes along a few minutes later and provides the same parameters, the system has to re-generate the "page" for the second user. But if the "page" generated for the first user is cached somewhere in a hierarchical namespace, an embodiment of the invention can be used to locate and retrieve that document, without having to wait for the system to re-generate the document for later users. Hence the applicability of the invention.

Some readers might think that there is no locality of reference cue provided in set 1405. It is true that there is no "explicit" locality of reference cue shown in set 1405. But that does not mean that there is no locality of reference cue. In fact, there is an implied locality of reference cue in the order of the flat identifiers. This implied locality of reference cue is a consequence of the structure of the hierarchical namespace, as discussed below with reference to FIG. 15.

Figure 15:
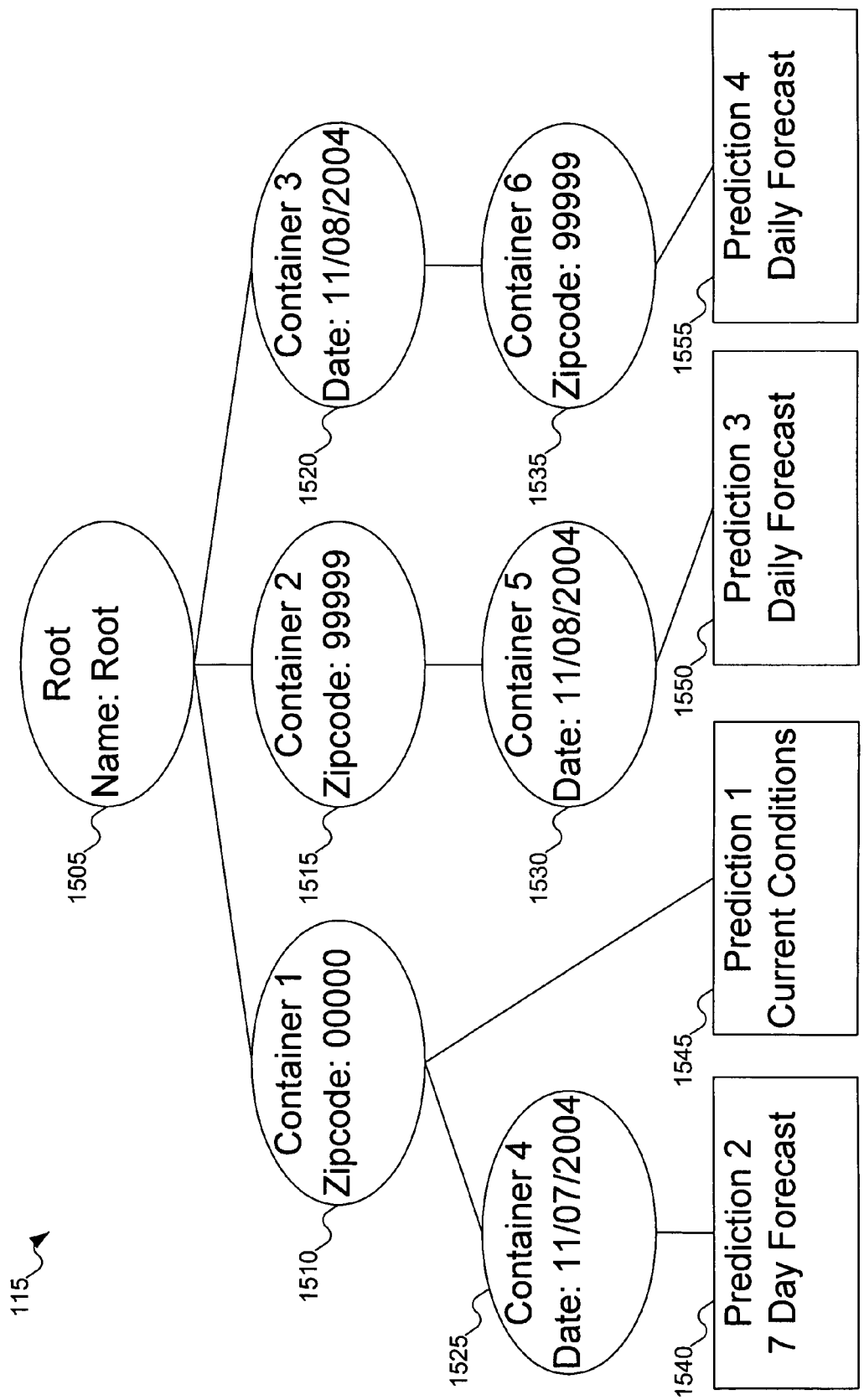
FIG. 15 shows an example of the hierarchical namespace of FIG. 1 equipped to handle sets of flat identifiers, according to an embodiment of the invention.

FIG. 15 shows an example of the hierarchical namespace of FIG. 1 equipped to handle sets of flat identifiers, according to an embodiment of the invention. Hierarchical namespace 115 shown in FIG. 15 is adapted to support the embodiment of the invention described above with reference to FIG. 14, but a person skilled in the art will recognize how hierarchical namespace 115 can be adapted for other embodiments of the invention. In FIG. 15, hierarchical namespace 115 includes root container 1505, which shows three sub-containers 1510, 1515, and 1520. Although FIG. 15 shows three such sub-containers, a person skilled in the art will recognize that there can be any number of containers within root container 1505, as discussed earlier with reference to FIG. 2. Containers 1510, 1515, and 1520 each represent the first parameter (i.e., a flat identifier) provided to the network address. Further, each nested container adds an additional parameter (i.e., flat identifier) to the network address. Thus, container 1525 indicates that the parameters (i.e., flat identifiers) to the network address included "zipcode=00000" and "date= Nov. 7, 2004", container 1530 indicates that the parameter list included "zipcode=99999" and "date= Nov. 8, 2004", and container 1535 indicates that the parameter list included "date= Nov. 8, 2004" and "zipcode=99999".

Objects within the containers represent generated documents that included the desired data. Thus, object 1540 provided the 7-day forecast for zip code 00000, beginning on Nov. 7, 2004, and object 1545 provided the current conditions for zip code 00000. (Note that container 1510 includes both container 1525 and object 1545. As discussed above, objects can be included in the hierarchical namespace at any desired level.) Objects 1550 and 1555 both represent the daily forecast for Nov. 8, 2004 in zip code 99999; object 1550 is the object desired by the set of flat identifiers shown in FIG. 14.

The reader might be wondering why two different objects (objects 1550 and 1555) are shown in FIG. 15, when they represent the same basic data. The answer to this question requires recognizing an implicit assumption of the model that might not, in fact, be correct. This assumption is that parameter order is irrelevant to the document produced. While this assumption is valid for the example shown in FIGS. 14-15, as a general rule this assumption cannot be made. That is, in general there is no way to know whether parameter order is significant to the final data.

As an example of why this assumption cannot be made generally, consider the following (arbitrary) calculation. When parameter A is encountered, the system takes the previous value and multiplies it by 2; when parameter B is encountered, the system adds 3 to the previous value. Initially, the value is 0. If the parameter order is "A, B", then the end result of the calculation is 3. But if the parameter order is "B, A", then the end result of the calculation is 6. While this example is trivial and arbitrary, a person skilled in the art will recognize other situations that are more practical and in which parameter order is significant (such as, where there are side effects to parameter order). Thus, assuming parameter order to be irrelevant in the embodiments of the invention would impose limitations on the use of the invention: situations where parameter order matters would require adding a new parameter (specifically specifying parameter order) or some other adaptation, or the invention would not be usable in such situations. To keep embodiments of the invention as general as possible, parameter order is treated as significant. As is seen, this imposes a cost where parameter order is not relevant, but the cost is slight and offset by the more general utility of the invention. Of course, a person skilled in the art will recognize that embodiments of the invention can easily be adapted to assume parameter order is irrelevant, at the cost of a less general solution and slightly greater implementation complexity (to be able to search the hierarchical namespace for the desired object with the parameters in any order).

Thus, objects 1550 and 1555 might well represent different objects. Of course, in the example of FIGS. 14-15, there is no reason objects 1550 and 1555 cannot reference the same document, even though the objects themselves are different objects in the hierarchical namespace.

Returning to FIG. 14, the reader should now understand why parameter order can be used as a locality of reference cue, and therefore set 1405 actually does include a locality of reference cue. But, as discussed above with reference to FIGS. 1-5, the locality of reference cue can be virtually any desired data, either explicitly or implicitly supplied. Thus, even though FIG. 14 uses the implied locality of reference cue based on parameter order, a person skilled in the art will recognize that any desired data can be used as a locality of reference cue, and can be used in conjunction with set 1405 to search the cache for a sought object. A person skilled in the art will also recognize that there can be multiple locality of reference cues used in concert (although this variation can also be handled by combining the multiple locality of reference cues into a single locality of reference cue and using that one locality of reference cue as discussed above).

Although FIG. 14 shows the resource being sought as data from a web site using a CGI (Common Gateway Interface) script, a person skilled in the art that the sought resource can be virtually anything. Other example resources include SQL databases, SOAP (Simple Object Access Protocol) documents, a program on a network, or even a command-line program with parameters.

FIG. 14 describes the embodiment of the invention as resolving a set of flat identifiers to a single hierarchical object. A person skilled in the art will recognize that the embodiments of the invention can be generalized to resolve a set of flat identifiers to a set of hierarchical identifiers. For example, in the situation above where "Joe", "Bev", and "Ana" needed to be authenticated in parallel to complete an objective, the set of flat identifiers can be resolved to a set of hierarchical identifiers: the appropriate hierarchical identifiers for each of "Joe", "Bev", and "Ana". But a person skilled in the art will also recognize that the "many-to-many" situation where a set of flat identifiers is to be resolved to a set of hierarchical identifiers can also be treated as the composition of a "many-to-one" resolution and a "one-to-many" resolution. That is, a "many-to-many" mapping can be treated as a "many-to-one" mapping combined with a "one-to-many" mapping. For example, the combination of flat identifiers "Joe", "Bev", and "Ana" can map to a single hierarchical object, which in turn can map to the appropriate hierarchical objects for "Joe", "Bev", and "Ma" to use in resolving the combination.

Although not shown in the figures, the modification of the cache to support sets of flat identifiers should be readily apparent. That is, instead of storing the single flat identifier, the cache stores the set of flat identifiers. Similar modifications to support sets of hierarchical identifiers should also be apparent.

The term "set" is used above with reference to FIGS. 14-15 and below in FIGS. 16A-16D. From a purely mathematical point of view, a set is an unordered grouping. This interpretation would appear to be at odds with the uses described above, which suggest that the order of the flat identifiers matters (at least with respect to the locality of reference cue and to the structure of the hierarchical namespace). But as should be clear, sometimes order matters and sometimes it does not matter. The reader should recognize from the context of the application of the embodiments of the invention whether order matters, and that order can matter even when the group of flat identifiers is termed a "set".

Figure 16A:
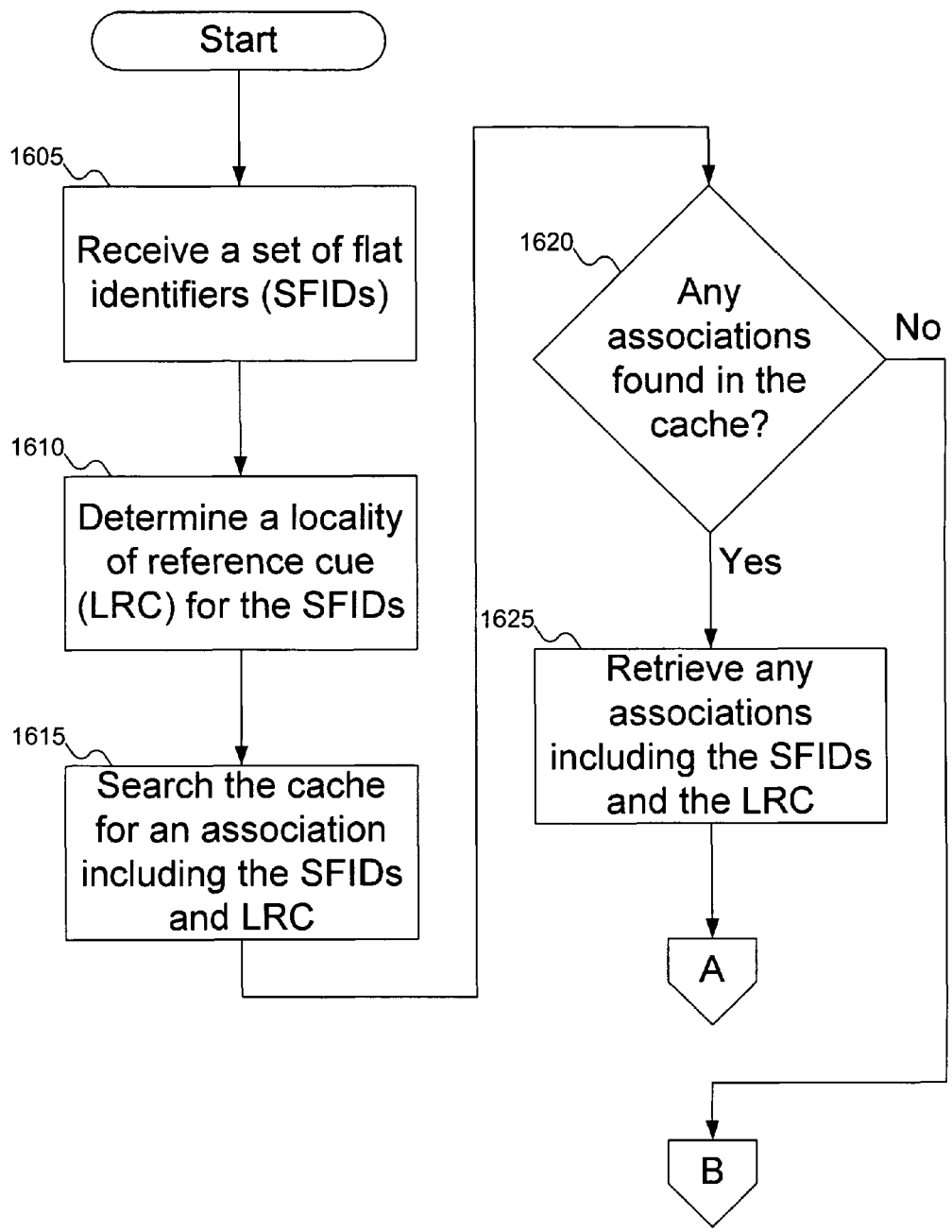
FIGS. 16A-16D show a flowchart of the procedure for using the cache of FIG. 1 to map sets of flat identifiers, according to an embodiment of the invention.
Figure 16B:
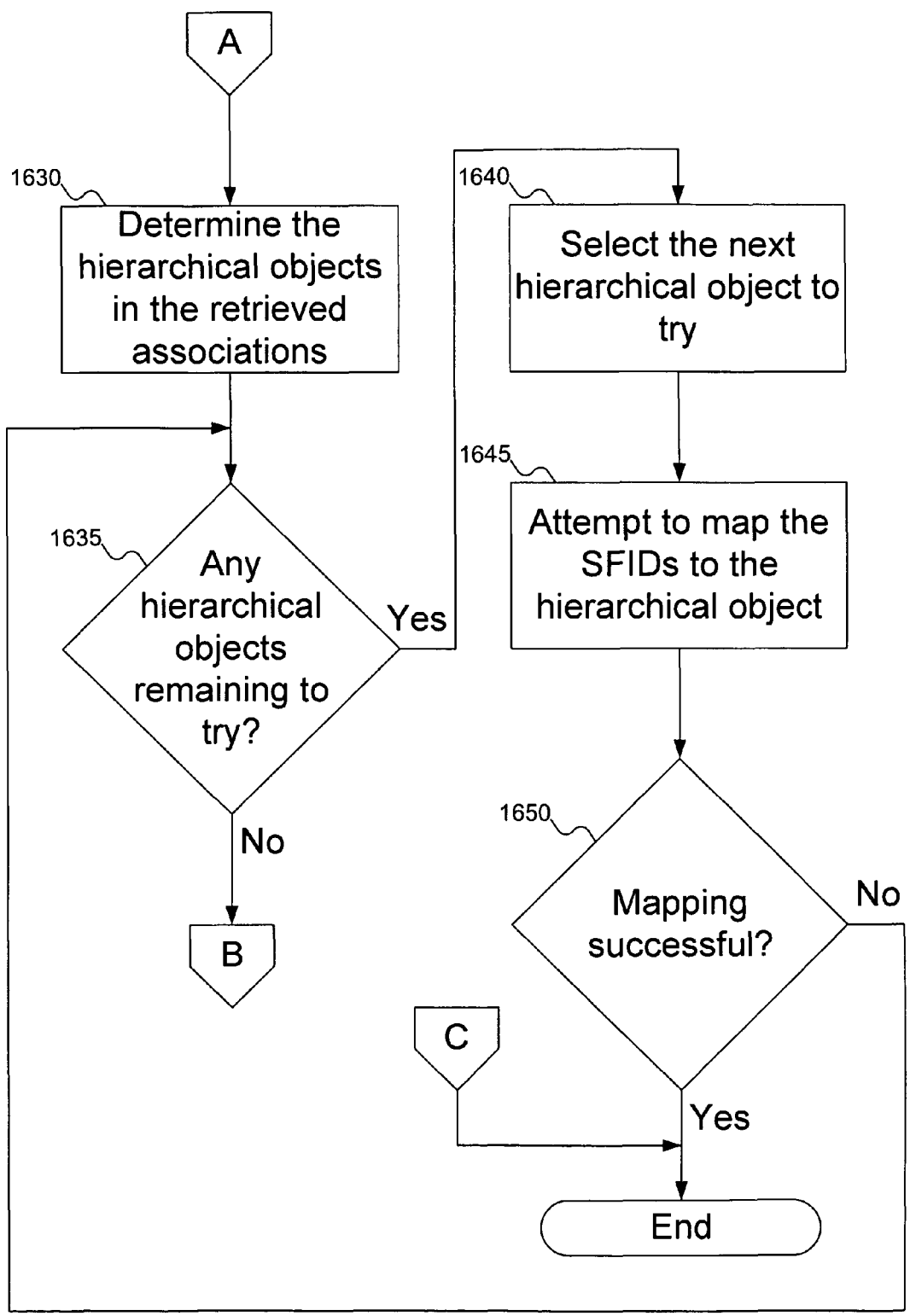
Figure 16C:
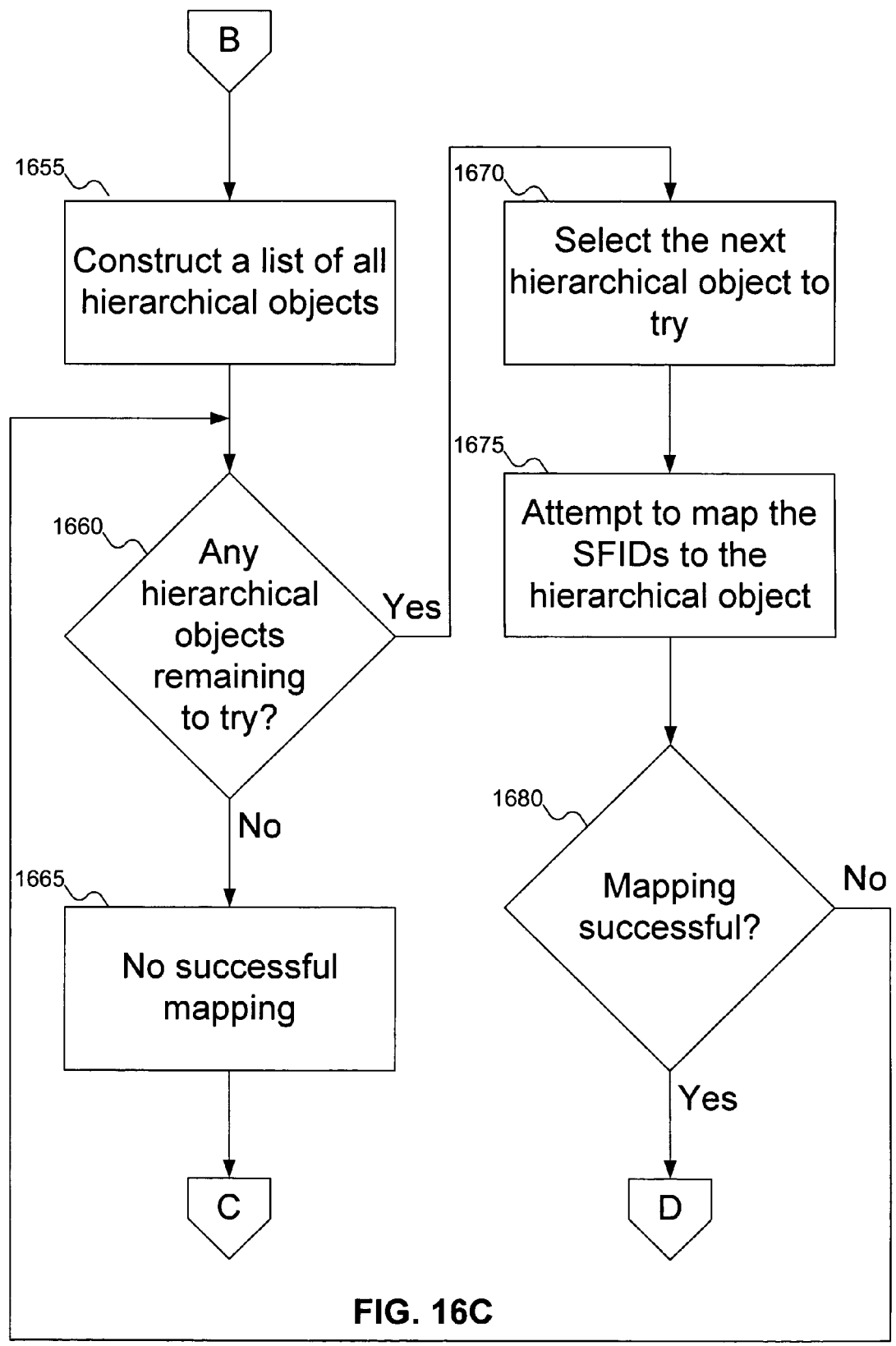

FIGS. 16A-16D show a flowchart of the procedure for using the cache of FIG. 1 to map sets of flat identifiers, according to an embodiment of the invention. In FIG. 16A, at step 1605, the system receives a set of flat identifiers. At step 1610, the system determines the locality of reference cue for the set of flat identifiers. At step 1615, the system searches the cache for any association including the combination of the set of flat identifiers and the locality of reference cue. At step 1620, the system checks to see if any such associations were found. If any associations were found, then at step 1625, the associations are retrieved.

Continuing the processing when associations including the combination of the set of flat identifiers and the locality of reference cue are found in the cache, at step 1630 (FIG. 16B), the associated hierarchical objects are identified. At step 1635, the system checks to see if there are any hierarchical objects remaining to test. If so, then at step 1640, the system selects the next hierarchical object to try, and at step 1645 the system attempts to map the set of flat identifiers to the hierarchical object. At step 1650, the system checks to see if the mapping succeeded. If so, then processing terminates. Otherwise, the system returns to step 1635 to try and find another hierarchical object to try.

If none of the associations produced a hierarchical object to which the set of flat identifiers could be mapped, or if there were no such associations at all, then at step 1655 (FIG. 16C), the system constructs a list of all possible hierarchical objects to try. At step 1660, the system checks to see if there are any hierarchical objects remaining to test. If not, then at step 1665 the system notes the failed mapping, and processing terminates. Otherwise, at step 1670, the system selects the next hierarchical object to try, and at step 1675, the system attempts to map the set of flat identifiers to the hierarchical object. At step 1680, the system checks to see if the mapping succeeded. If the mapping failed, then the system returns to step 1660 to try and find another hierarchical object to try.

If the mapping succeeded in step 1680, then at step 1685 (FIG. 16D), the system checks to see if the cache is to be updated. If so, then at step 1690, the system checks to see an association including the combination is already in the cache. If not, then at step 1695, the system adds the association of the set of flat identifiers, the locality of reference cue, and the hierarchical object to the cache. Processing them completes.

Figure 16D:
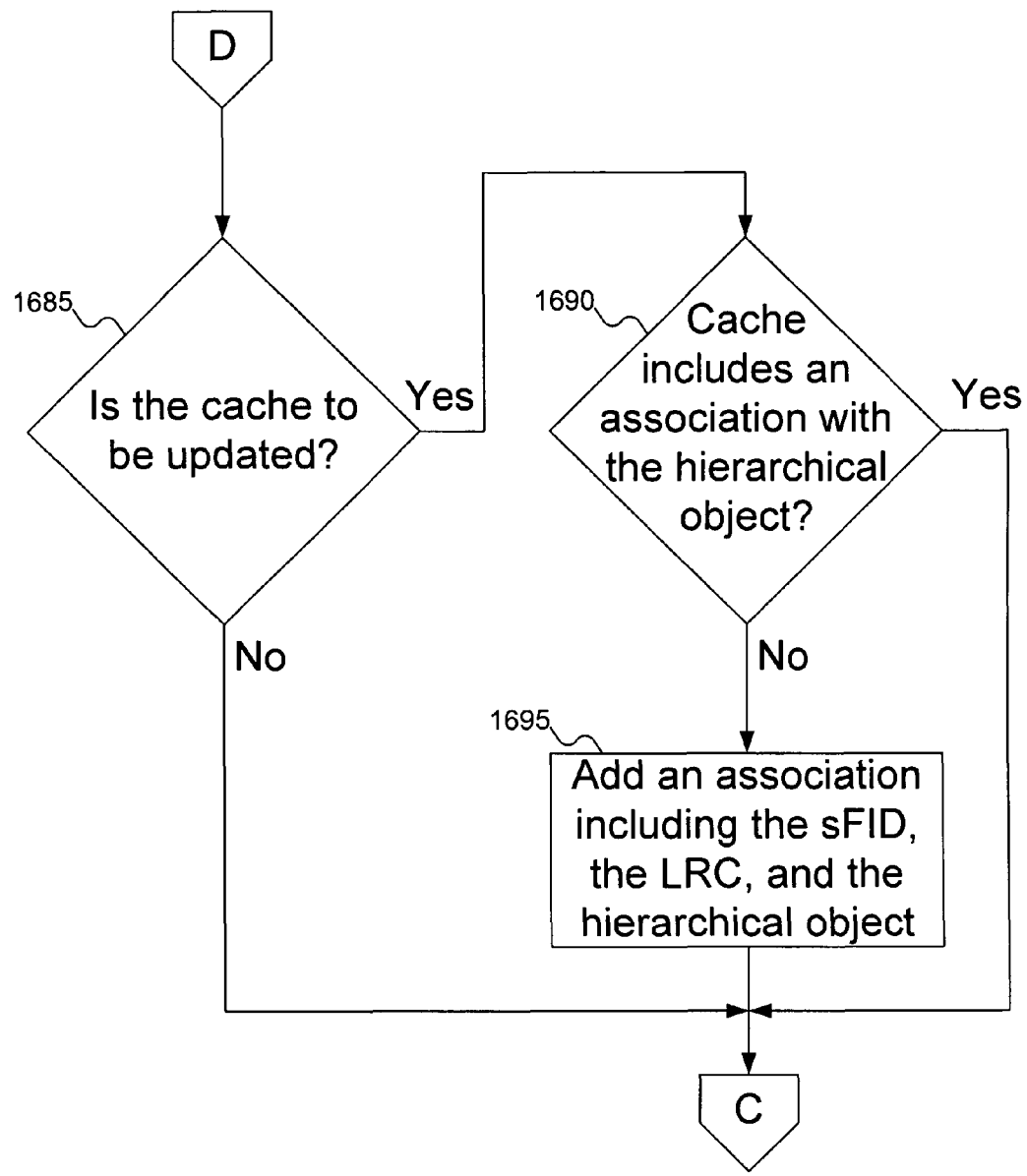

At this point, it is worth commenting about FIG. 16D. In situations such as the example described above with reference to FIGS. 14-15, the utility of the invention lies in avoiding the need to actually re-generate the document (i.e., the hierarchical object) for each user (or set of flat identifiers). But obviously, before an embodiment of the invention can provide this advantage, an embodiment of the invention has to know what document (hierarchical object) is intended by the combination of the set of flat identifiers and the locality of reference cue. This document has to be generated before it can be referenced to the hierarchical namespace in the cache (and, in fact, would need to be added to the hierarchical namespace before the reference can be made). Thus, the first time a particular such document would be needed, it would have to be generated. But after that first generation, the document can be accessed via the cache reference, avoiding the need to regenerate the document and providing the utility of the embodiments of the invention.

FIG. 16D can be omitted if the cache is populated manually instead of automatically. For situations where the references are to objects that are relatively unchanging and relatively few in number, the cache can be manually populated, and locked so that it cannot be updated. (The cache could also be initially populated manually, and then updated either manually or automatically as desired, of course.) But where the number of referenced documents can be unwieldy or where the referenced documents have a limited lifetime, as with the example of FIGS. 14-15, automatic population of the cache can be simpler and provide advantages in the long run (over not using an embodiment of the invention at all).

One point not discussed above has to do with aging of referenced documents. In the example of FIGS. 14-15, there is little value in retaining a weather forecast for days already past. To remove such references from the cache, any desired aging algorithm can be used. Because such algorithms are already known, they are not discussed specifically here.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, volatile and/or non-volatile memory, e.g., RAM, ROM, etc., or in other storage devices and their associated storage media, including hard-drives, floppy-disks, optical storage, tapes, flash memory, memory sticks, digital video disks, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus, comprising:
   a computer, including a memory;
   a hierarchical namespace stored in the memory of the computer, the hierarchical namespace including at least one hierarchical container, said hierarchical container including a first hierarchical object; and
   a cache stored in the memory of the computer, the cache designed to store at least one association, said association including a reference to said first hierarchical object, a combination of a set of flat names and a locality of reference cue for said set of flat names, said set of flat names including at least three flat names and configured to map to at least said first hierarchical object and a second hierarchical object in the hierarchical namespace, said locality of reference cue obtained by the computer for purposes other than identifying said first hierarchical object and, in combination with the set of flat names, assisting in identifying said reference to said first hierarchical object;
   if the cache contains the combination of the set of flat names and the locality of reference cue, means for attempting to map the set of flat names to the first hierarchical object whose reference is associated with the combination of the set of flat names and the locality of reference cue,
   so that, if the cache includes said association, said first hierarchical object is located when a user provides said set of flat names.

2. An apparatus according to claim 1, wherein said locality of reference cue includes an ordering of said flat names in said set of flat names.

3. An apparatus according to claim 1, wherein:
   said hierarchical namespace includes at least said second hierarchical object; and
   the cache is designed to store at least a second association, said second association including a reference to said second hierarchical object, a second combination of a second set of flat names and a second locality of reference cue for said second set of flat names, said second set of flat names including at least one flat name included in said set of flat names.

4. An apparatus according to claim 3, wherein said hierarchical container includes said second hierarchical object.

5. An apparatus according to claim 3, wherein said hierarchical namespace includes at least a second hierarchical container, said second hierarchical container including at least said second hierarchical object.

6. An apparatus according to claim 1, wherein:
   the hierarchical namespace includes a plurality of hierarchical objects organized in said at least one hierarchical container; and said association includes a reference to each of said plurality of hierarchical objects, said combination of said set of flat names and said locality of reference cue for said set of flat names.

7. A method for mapping a set of flat identifiers to a hierarchical object, comprising:
receiving the set of flat identifiers, the set of flat identifiers including at least three flat identifiers and configured to map to at least two hierarchical objects in a hierarchical namespace, the hierarchical namespace including at least one hierarchical container, the hierarchical container including at least one of the at least two hierarchical objects;
determining a locality of reference cue for the set of flat identifiers, the locality of reference cue obtained for purposes other than identifying the at least one of the at least two hierarchical objects;
searching a cache for at least one combination of the set of flat identifiers and the locality of reference cue, the cache designed to store an association including a combination of a set of flat names and a locality of reference cue for the set of flat names, and a reference to the at least one of the at least two hierarchical objects; and
if the cache contains the combination of the set of flat identifiers and the locality of reference cue, attempting to map the set of flat identifiers to the at least one of the at least two hierarchical objects whose reference is associated with the combination of the set of flat identifiers and the locality of reference cue in the cache,
so that the at least one of the at least two hierarchical objects is located when a user provides the set of flat names if the cache contains the combination.

8. A method according to claim 7, wherein attempting to map the set of flat identifiers to the at least one of the at least two hierarchical objects includes attempting to map the set of flat identifiers to a first set of hierarchical objects whose references are associated with the combination of the set of flat identifiers and the locality of reference cue in the cache.

9. A method according to claim 8, further comprising attempting to map the set of flat identifiers to a second set of hierarchical objects in the hierarchical namespace if the cache does not contain the combination of the set of flat identifiers and the locality of reference cue.

10. A method according to claim 9, further comprising adding to the cache references to the second set of hierarchical objects associated with the combination of the set of flat identifiers and the locality of reference cue if the attempt to map the set of flat identifiers to the second set of hierarchical objects succeeds.

11. A method according to claim 8, further comprising attempting to map the set of flat identifiers to a second set of hierarchical objects if the attempt to map the set of flat identifiers to the first set of hierarchical objects fails.

12. A method according to claim 11, further comprising adding to the cache references to the second set of hierarchical objects associated with the combination of the set of flat identifiers and the locality of reference cue if the attempt to map the set of flat identifiers to the second set of hierarchical objects succeeds.

13. A method according to claim 8, wherein the locality of reference cue includes an ordering of the set of flat identifiers.

14. A method according to claim 8, wherein attempting to map the set of flat identifiers to a first set of hierarchical objects whose references are associated with the combination of the set of flat identifiers and the locality of reference cue in the cache includes attempting to map the set of flat identifiers to the first set of hierarchical objects whose references are associated with the combination of the set of the flat identifiers and the locality of reference cue, the first set of hierarchical objects including a plurality of hierarchical objects.

15. A method according to claim 14, wherein attempting to map the set of flat identifiers to the first set of hierarchical objects whose references are associated with the combination of the set of the flat identifiers and the locality of reference cue, the first set of hierarchical objects including a plurality of hierarchical objects includes returning the first set of hierarchical objects.

16. A method according to claim 7, wherein:
receiving the set of flat identifiers includes receiving a resource reference and a set of parameters for the resource;
searching a cache includes searching the cache for a combination of the resource reference, the parameters for the resource, and a locality of reference cue for the resource reference and the parameters for the resource; and
attempting to map the flat identifier to a first hierarchical object includes attempting to locate an object that represents the resource reference with the set of parameters and the locality of reference cue.

17. A method according to claim 16, wherein:
searching a cache includes searching the cache for a combination of the resource reference, the parameters for the resource, and an ordering for the resource reference and the parameters for the resource; and
attempting to map the flat identifier to a first hierarchical object includes attempting to locate an object that represents the resource reference with the set of parameters and the ordering for the resource reference and the parameters for the resource.

18. A method according to claim 16, wherein receiving a resource reference and a set of parameters for the resource includes receiving the resource reference and the set of parameters for the resource, the resource including data.

19. An article comprising:
a storage medium, said storage medium having stored thereon instructions, that, when executed by a machine, result in:
receiving a set of flat identifiers, the set of flat identifiers including at least three flat identifiers and configured to map to at least two hierarchical objects in a hierarchical namespace, the hierarchical namespace including at least one hierarchical container, the hierarchical container including at least one of the at least two hierarchical objects;
determining a locality of reference cue for the set of flat identifiers, the locality of reference cue obtained for purposes other than identifying the at least one of the at least two hierarchical objects;
searching a cache for at least one combination of the set of flat identifiers and the locality of reference cue, the cache designed to store an association including a combination of a set of flat names and a locality of reference cue for the set of flat names, and a reference to the at least one of the at least two hierarchical objects; and
if the cache contains the combination of the set of flat identifiers and the locality of reference cue, attempting to map the set of flat identifiers to the at least one of the at least two hierarchical objects whose reference is associated with the combination of the set of flat identifiers and the locality of reference cue in the cache,
so that the at least one of the at least two hierarchical objects is located when a user provides the set of flat names if the cache contains the combination.

20. An article according to claim 19, wherein attempting to map the set of flat identifiers to the at least one of the at least two hierarchical objects includes attempting to map the set of flat identifiers to a first set of hierarchical objects whose references are associated with the combination of the set of flat identifiers and the locality of reference cue in the cache.

21. An article according to claim 20, wherein the storage medium has further instructions stored thereon that, when executed by the machine result in attempting to map the set of flat identifiers to a second set of hierarchical objects in the hierarchical namespace if the cache does not contain the combination of the set of flat identifiers and the locality of reference cue.

22. An article according to claim 21, wherein the storage medium has further instructions stored thereon that, when executed by the machine result in adding to the cache references to the second set of hierarchical objects associated with the combination of the set of flat identifiers and the locality of reference cue if the attempt to map the set of flat identifiers to the second set of hierarchical objects succeeds.

23. An article according to claim 20, wherein the storage medium has further instructions stored thereon that, when executed by the machine result in attempting to map the set of flat identifiers to a second set of hierarchical objects if the attempt to map the set of flat identifiers to the first set of hierarchical objects fails.

24. An article according to claim 23, wherein the storage medium has further instructions stored thereon that, when executed by the machine result in adding to the cache references to the second set of hierarchical objects associated with the combination of the set of flat identifiers and the locality of reference cue if the attempt to map the set of flat identifiers to the second set of hierarchical objects succeeds.

25. An article according to claim 20, wherein the locality of reference cue includes an ordering of the set of flat identifiers.

26. An article according to claim 20, wherein attempting to map the set of flat identifiers to a first set of hierarchical objects whose references are associated with the combination of the set of flat identifiers and the locality of reference cue in the cache includes attempting to map the set of flat identifiers to the first set of hierarchical objects whose references are associated with the combination of the set of the flat identifiers and the locality of reference cue, the first set of hierarchical objects including a plurality of hierarchical objects.

27. An article according to claim 26, wherein attempting to map the set of flat identifiers to the first set of hierarchical objects whose references are associated with the combination of the set of the flat identifiers and the locality of reference cue, the first set of hierarchical objects including a plurality of hierarchical objects includes returning the first set of hierarchical objects.

28. An article according to claim 19, wherein:
receiving the set of flat identifiers includes receiving a resource reference and a set of parameters for the resource;
searching a cache includes searching the cache for a combination of the resource reference, the parameters for the resource, and a locality of reference cue for the resource reference and the parameters for the resource; and
attempting to map the flat identifier to a first hierarchical object includes attempting to locate an object that represents the resource reference with the set of parameters and the locality of reference cue.

29. An article according to claim 28, wherein:
searching a cache includes searching the cache for a combination of the resource reference, the parameters for the resource, and an ordering for the resource reference and the parameters for the resource; and
attempting to map the flat identifier to a first hierarchical object includes attempting to locate an object that represents the resource reference with the set of parameters and the ordering for the resource reference and the parameters for the resource.

30. An article according to claim 28, wherein receiving a resource reference and a set of parameters for the resource includes receiving the resource reference and the set of parameters for the resource, the resource including data.

31. A system comprising a processor, comprising: means for receiving the set of flat identifiers, the set of flat identifiers including at least three flat identifiers and configured to map to at least two hierarchical objects in a hierarchical namespace, the hierarchical namespace including at least one hierarchical container, the hierarchical container including at least one of the at least two hierarchical objects;
means for determining a locality of reference cue for the set of flat identifiers, the locality of reference cue obtained for purposes other than identifying the at least one of the at least two hierarchical objects;
means for searching a cache for at least one combination of the set of flat identifiers and the locality of reference cue, the cache designed to store an association including a combination of a set of flat names and a locality of reference cue for the set of flat names, and a reference to the at least one of the at least two hierarchical objects; and
if the cache contains the combination of the set of flat identifiers and the locality of reference cue, means for attempting to map the set of flat identifiers to the at least one of the at least two hierarchical objects whose reference is associated with the combination of the set of flat identifiers and the locality of reference cue in the cache,
so that the at least one of the at least two hierarchical objects is located when a user provides the set of flat names if the cache contains the combination.

* * * * *